United States Patent [19]
Mitsuda et al.

[11] Patent Number: 5,563,733
[45] Date of Patent: Oct. 8, 1996

[54] OPTICAL FIBER AMPLIFIER AND OPTICAL FIBER TRANSMISSION SYSTEM

[75] Inventors: Masahiro Mitsuda, Kyoto; Jun Ohya; Tomoaki Uno, both of Osaka, all of Japan

[73] Assignee: Matsushita Electric Industrial Co., Ltd., Osaka, Japan

[21] Appl. No.: 519,457

[22] Filed: Aug. 25, 1995

[30] Foreign Application Priority Data

Aug. 25, 1994 [JP] Japan ..................... 6-200657

[51] Int. Cl.⁶ .................... H01S 3/00; H04B 10/00; H04J 14/02
[52] U.S. Cl. ................... 359/341; 359/124; 359/134; 359/160
[58] Field of Search .................... 359/341, 124, 359/133, 134, 160; 385/24

[56] References Cited

U.S. PATENT DOCUMENTS

| | | | |
|---|---|---|---|
| 5,185,814 | 2/1993 | Healey | 385/24 |
| 5,365,368 | 11/1994 | Hsu et al. | 359/341 |
| 5,375,010 | 12/1994 | Zerva et al. | 359/341 |
| 5,416,864 | 5/1995 | Cassidy et al. | 385/30 |
| 5,452,116 | 9/1995 | Kirkby et al. | 359/124 |

OTHER PUBLICATIONS

Bo Pedersen et al., "The Design of Erbium–Doped Fiber Amplifiers, Journal of Lightwave Technology," vol. 9, No. 9, pp. 1105–1112, (1991).
V. L. Da Silva et al., "Automatic gain flattening in Er–doped–fiber amplifiers", OFC/IOOC '93 Technical Digest, THD2, pp. 174–175, (1993).
E. L. Goldsein et al., "Suppression of Dynamic Cross–saturation in Multiwavelength Lightwave Networks with Inhomogeneously Broadened Fiber Amplifiers", Optical Amplifiers and Their Applications, vol. 14, pp. 70–73 (1993).
S. Shimokado et al., "Bidirectional WDM Optical Fiber Amplifiers–Bridge Type", w/English translation, Proceedings of the 1993 IEICE Spring Conference, C–198, 4–234, (1993).

Primary Examiner—Mark Hellner
Attorney, Agent, or Firm—Ratner & Prestia

[57] ABSTRACT

An optical fiber amplifier for optically amplifying a plurality of signals having different wavelengths includes a series of rare earth doped optical fibers and at least one pump light source generating pump light for exciting the series of rare earth doped optical fibers. A first signal among the plurality of signals propagates through a part of the series of rare earth doped optical fibers, and a second signal among the plurality of signals propagates through all of the series of rare earth doped optical fibers.

23 Claims, 17 Drawing Sheets

OPTICAL FIBER AMPLIFIER AND OPTICAL FIBER TRANSMISSION SYSTEM

BACKGROUND OF THE INVENTION

1. Field of the Invention

The present invention relates to an optical fiber amplifier for a light transmission system using an optical fiber as a transmission route, and more particularly, relates to an optical fiber amplifier capable of amplifying optical signals so that the gains of the signals are made equal to each other, and an optical fiber transmission system employing such an optical fiber amplifier.

2. Description of the Related Art

A conventional multi-wavelength optical fiber amplifier or bidirectional optical fiber amplifier includes, at least, a rare earth doped optical fiber, a pump laser diode emitting pump light for exciting the rare earth ions, and an optical coupler for coupling the pump light to the rare earth doped optical fiber. When a signal is input into the optical fiber amplifier with the above configuration, the signal is amplified due to stimulated emission caused by the rare earth ions of a population inverted state. When a plurality of signals are attempted to be amplified simultaneously by a same rare earth doped optical fiber, the gains of the signals vary depending on the wavelengths thereof because the absorption and emission cross sections of the rare earth ions vary depending on the wavelengths.

Methods for suppressing such a variation in the gains depending on the wavelength have been reported. For example, B. Pedersen et al., "The Design of Erbium-Doped Fiber Amplifiers", Journal of Lightwave Technology, Vol.9, No.9, pp.1105–1112 (1991) describes that the wavelength dependency of the absorption and emission cross sections of a rare earth doped optical fiber, which is the cause of the gain variation, can be reduced by using aluminum ions as a codopant.

Using an acousto-optical element to suppress the gain variation is proposed in OFC/IOOC '93, Paper ThD2, 1993, and using a fiber grating is proposed in OFC '91, Paper PD20-1, 1991. E. L. Goldstein et al. "Suppression of Dynamic Cross-saturation in Multiwavelength Lightwave Networks with Inhomogeneously Broadened Fiber Amplifiers", OAA '93, Paper SuE3-1, pp.70–73, 1993 proposes to connect a plurality of optical fiber amplifiers in series so that the gain and wavelength characteristics can be cancelled each other.

In any of the above proposals, however, the gains of signals are made equal only when the input powers of the signals are equal. The idea of equalizing the gains of signals with different input powers has not been examined.

The input power of an analog signal input into an optical fiber amplifier is large, while that of a digital signal is small. Accordingly, when the analog signal and the digital signal are to be amplified simultaneously as in the case of a bidirectional optical amplifier, this large power difference basically causes the gains of the respective signals to vary from each other. Further, in the case where a plurality of optical fiber amplifiers are connected in series to be used for a distribution system, the gain variation causes a lack of power at light receiving section because each signal receives an equal distribution loss. As a result, transmission characteristics of the signals degrade.

SUMMARY OF THE INVENTION

The optical fiber amplifier of this invention for optically amplifying a plurality of signals having different wavelengths includes a series of rare earth doped optical fibers and at least one pump light source generating pump light for exciting the series of rare earth doped optical fibers. A first signal among the plurality of signals propagates through a part of the series of rare earth doped optical fibers, and a second signal among the plurality of signals propagates through all of the series of rare earth doped optical fibers.

In another aspect of the present invention, a bidirectional optical fiber amplifier includes a first input/output section for at least outputting a first signal and receiving a second signal; a second input/output section for at least receiving the first signal and outputting the second signal; an optical fiber amplifying section connected to the first and second input/output sections, the optical fiber amplifying section optically amplifying a plurality of signals having different wavelengths, and comprising a series of rare earth doped optical fibers and at least one pump light source generating pump light for exciting the series of rare earth doped optical fibers, a first signal among the plurality of signals propagating through a part of the series of rare earth doped optical fibers, while a second signal among the plurality of signals propagating through all of the series of rare earth doped optical fibers; and a dividing element for selectively transmitting the first signal received from the optical fiber amplifying section to the first input/output section.

In still another aspect of the present invention, an optical fiber transmission system includes a transmitting station including a first signal light source for emitting a first signal and a first light receiver for detecting a second signal; a receiving station including a second light receiver for detecting the first signal and a second signal light source for emitting the second signal; an optical fiber transmission route for connecting the transmitting station and the receiving station; and an optical fiber amplifier disposed midway of the optical fiber transmission route. The optical fiber amplifying section optically amplifies a plurality of signals having different wavelengths, comprising a series of rare earth doped optical fibers and at least one pump light source generating pump light for exciting the series of rare earth doped optical fibers, and a first signal among the plurality of signals propagates through a part of the series of rare earth doped optical fibers, and a second signal among the plurality of signals propagates through all of the series of rare earth doped optical fibers.

In still another aspect of the present invention, an optical fiber transmission system includes a transmitting station including first signal light source for emitting a first signal and a first light receiver for detecting a second signal; a receiving station including a second light receiver for detecting the first signal and a second signal light source for emitting the second signal; a bidirectional optical fiber transmission route for connecting the transmitting station and the receiving station and an optical fiber amplifier disposed midway of the optical fiber transmission route. The bidirectional optical fiber includes a first input/output section for at least outputting a first signal and receiving a second signal; a second input/output section for at least receiving the first signal and outputting the second signal; an optical fiber amplifying section connected to the first and second input/output sections, the optical fiber amplifying section optically amplifying a plurality of signals having different wavelengths, and comprising a series of rare earth doped optical fibers and at least one pump light source generating pump light for exciting the series of rare earth doped optical fibers, a first signal among the plurality of signals propagating through a part of the series of rare earth doped optical fibers, while a second signal among the plurality of signals propagating through all of the series of rare earth doped optical fibers; and a dividing element for selectively transmitting the first signals received from the optical fiber amplifying section to the first input/output section.

Thus, according to the present invention, by additionally amplifying a signal with a low gain, the gain of the signal can be compensated. Accordingly, the gains of a plurality of signals with different wave-lengths and different input powers can be made equal.

In the case where pump light is input from one end of a rare earth doped optical fiber, the pump light which has transmitted through the rare earth doped optical fiber is effectively used for further exciting another rare earth doped optical fiber so as to additionally amplify a signal. In the case where pump light is input from the both ends of a rare earth doped optical fiber, the gain compensation can be performed for signals of a wider range of input powers.

A rare earth doped optical fiber excited by 0.98 μm pump light may be disposed closer to the signal input section, so that the noise figure can be improved even when the total input power of a plurality of signals is large.

A bidirectional optical fiber which can amplify a plurality of signals while providing equal gains to the signals irrelevant of the transmission direction thereof is provided by using the above optical fiber amplifier capable of compensating the gains of the signals.

Thus, the invention described herein makes possible the advantages of (1) providing an optical fiber amplifier capable of obtaining equal gains for a plurality of signals having different input powers, and (2) providing an optical fiber transmission system employing such an optical fiber amplifier.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

Figure 2:
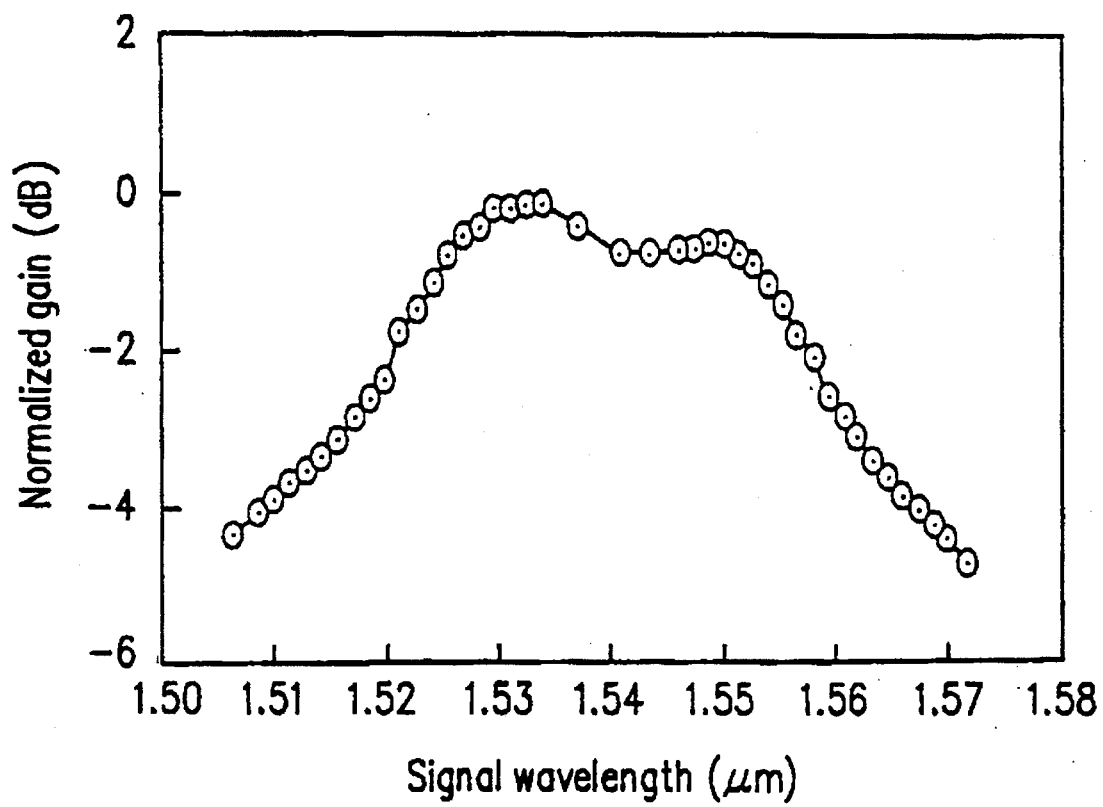
FIG. 2 shows the wavelength dependency of the gain in an erbium-doped optical fiber according to the present invention.

FIG. 2 shows the gain-wavelength characteristics of an erbium-doped optical fiber. As is observed from FIG. 2, the gain of the optical fiber has wave-length dependency. When an analog signal and a digital signal are simultaneously amplified, these signals may be appropriately set at the gain peak wavelengths of 1.53 μm and 1.56 μm.

Since the analog signal requires a high signal-to-noise ratio compared with the digital signal, it operates in a high input state. Accordingly, it is appropriate to allocate the high-input analog signal to the 1.56 μm band and the low-input digital signal to the 1.53 μm band, so as to minimize a variation in the characteristics of the analog signal with regard to those of the digital signal. In this case, however, while the gain of the long wavelength light remains high, the gain of the short wavelength light decreases.

In the following examples, the 1.56 μm light modulated with the analog signal is called as a "first signal", while the 1.53 μm light modulated with the digital signal is called as a "second signal". The input powers of the first signal and the second signal are assumed to be 0 dBm and −30 dBm, respectively.

EXAMPLE 1

Figure 1:
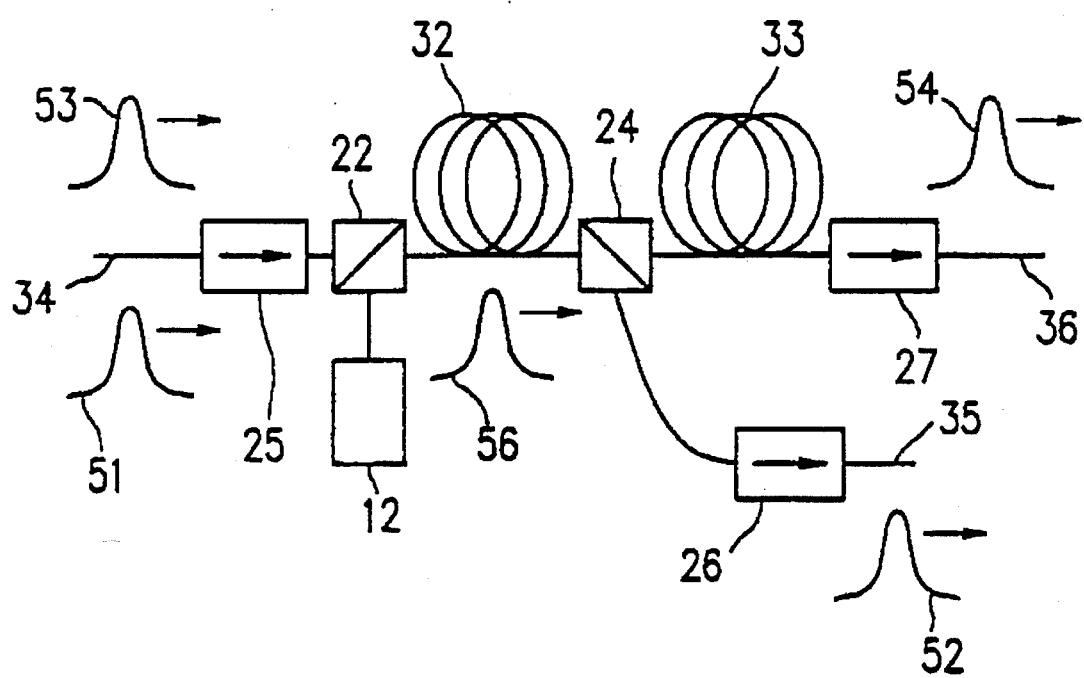
FIG. 1 shows a configuration of a first example of the optical fiber amplifier according to the present invention.

Referring to FIG. 1, a first example of the optical fiber amplifier according to the present invention will be described in detail.

The optical fiber amplifier shown in FIG. 1 includes a single input end, an amplifying section for optically amplifying a plurality of signals input through the input end, and a plurality of output ends for outputting the plurality of amplified signals. In this example, a signal having a wavelength of 1.56 μm modulated with an analog signal (a first signal 51) and a signal having a wavelength of 1.53 μm modulated with a digital signal (a second signal 53) are input through the input end, amplified, and output at two output ends.

The amplifying section includes a first erbium-doped optical fiber 32 for amplifying both the first signal 51 and the second signal 53, and a second erbium-doped optical fiber 33 for amplifying only the second signal 53. The erbium-doped optical fibers 32 and 33 are connected via a WDM (wavelength-division multiplexed) coupler 24. The WDM coupler 24 transmits the second signal 53 among a plurality of signals having passed through the erbium-doped optical fiber 32 to the erbium-doped optical fiber 33, while it selectively separates the first signal 51 from the other signals so as to be input into an optical fiber 35.

The first signal 51 is output at one output end through the optical fiber 35 and an optical isolator 26 inserted therein. The amplified first signal output from the optical fiber amplifier is denoted by the reference numeral 52. The second signal 53 amplified by the erbium-doped optical fiber 33 is output at the other output end through an optical fiber 36 and an optical isolator 27 inserted therein. The amplified second signal output from the optical fiber amplifier is denoted by the reference numeral 54.

The amplifying section further includes a pump laser diode 12 which emits pump light 56 (wavelength: 1.48 μm) for exciting the erbium-doped optical fibers 32 and 33. The 1.48 μm pump light 56 is coupled with a 1.55 μm signal by a WDM coupler 22, and the coupled light is input into the erbium-doped optical fiber 32. The first and second signals 51 and 53 are input into the WDM coupler 22 through an optical fiber 34 and an optical isolator 25 inserted therein. The 1.48 μm pump light 56 passes through the WDM coupler 24 and is input into the erbium-doped optical fiber 33 so as to also pump the erbium-doped optical fiber 33.

The operation of the optical fiber amplifier with the above configuration when signals are input thereinto will be described in detail.

The first 1.56 μm signal 51 and the second 1.53 μm signal 53 are incident to the input end of the optical fiber 34. The signals 51 and 53 are coupled with the 1.48 μm pump light 56 by the WDM coupler 22, and the coupled light is input into the erbium-doped optical fiber 32. The pump light 56 thus amplifies the signals 51 and 53, and attenuated transmitted components of the pump light 56 are input into the erbium-doped optical fiber 33 through the WDM coupler 24. The first 1.56 μm signal 51 is separated from the second signal 53 by the WDM coupler 24, and passes through the optical isolator 26 and the optical fiber 35 to be output from the optical fiber amplifier as the amplified first signal 52. The second 1.53 μm signal 53 passes through the WDM coupler 24 and is input into the erbium-doped optical fiber 33, where it is amplified by the transmitted pump light 56. The second 1.53 μm signal 53 then passes through the optical isolator 27 and the optical fiber 36 to be output from the optical fiber amplifier as the amplified second signal 54.

Figure 3:
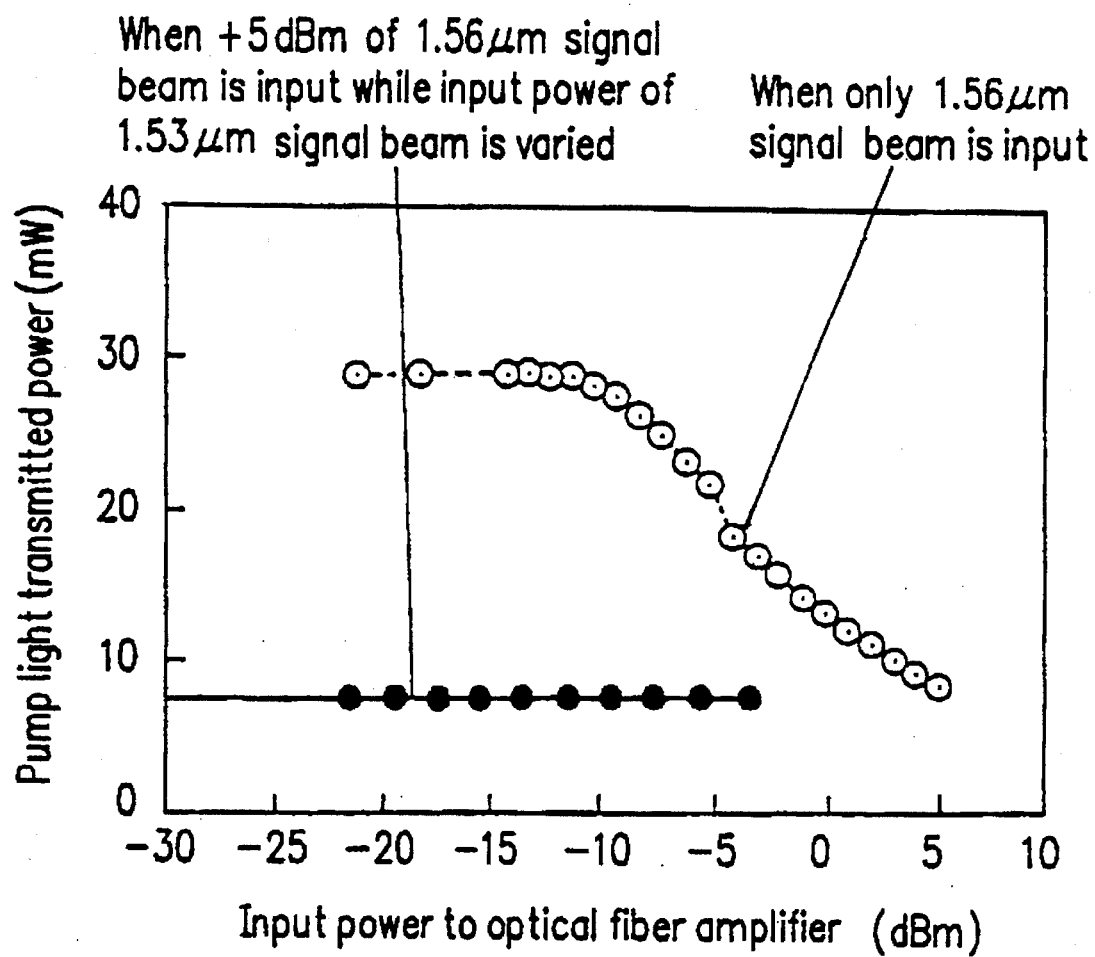
FIG. 3 shows the input power dependency of the pump light transmitted power in an erbium-doped optical fiber according to the present invention.

FIG. 3 shows the relationship between the input powers of the first and second signals (x axis) and the power of the transmitted pump light (y axis). It is observed from FIG. 3 that when only the first 1.56 μm signal is input, the power of the pump light obtained after the transmission through the erbium-doped optical fiber 32 is as much as 10 to 30 mW. Further, in the case where the input power of the first signal is several dBm (for example, +5 dBm as shown in FIG. 3) while the input power of the second signal is varied in the range of −20 to −3 dBm, the pump light of the order of 10 mW is obtained after the transmission through the erbium-doped optical fiber 32. This transmitted pump light is discarded as a loss in conventional optical fiber amplifiers. In this example, however, the transmitted pump light which would otherwise have been discarded as a loss is input into the erbium-doped optical fiber 33. Simultaneously, the second signal separated from the first signal is input into the erbium-doped optical fiber 33. Thus, the second signal can be additionally amplified. In other words, according to the present invention, the second signal can obtain a gain of the same level as that of the first signal by using the pump light obtained after the transmission through the first erbium-doped optical fiber.

Figure 4:
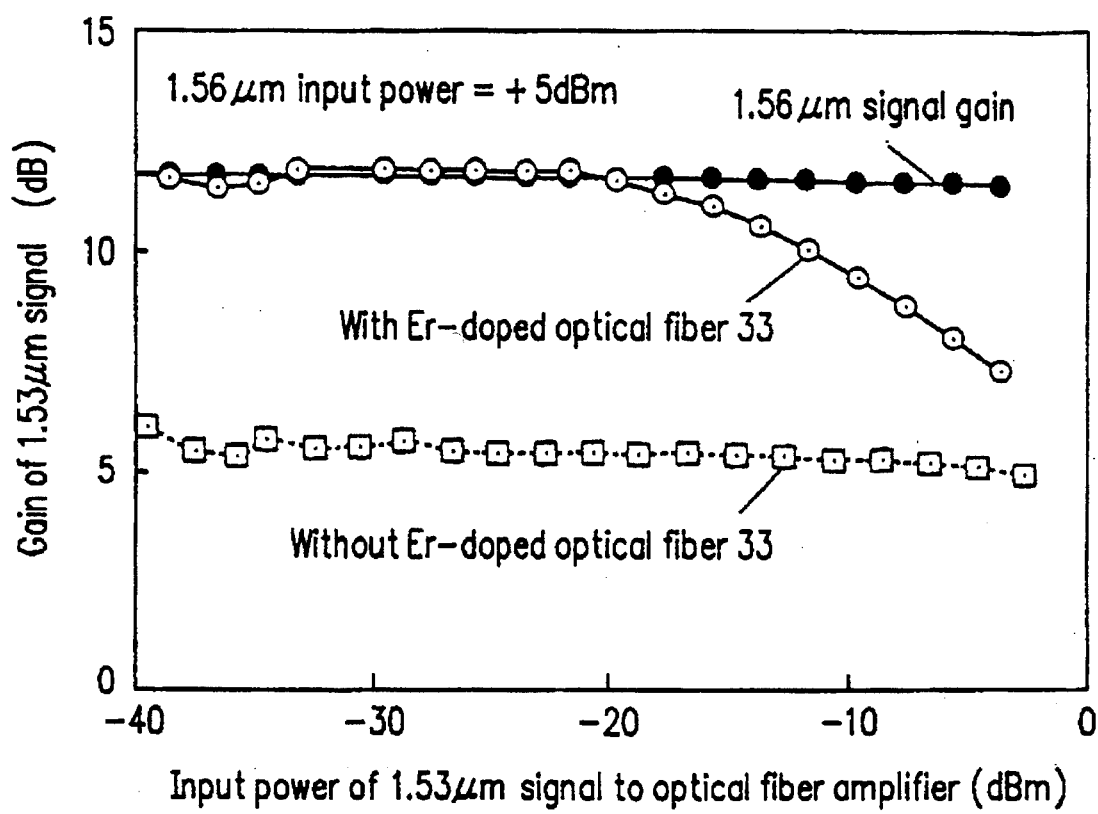
FIG. 4 compares the gains of a 1.53 μm signal and a 1.56 μm signal used for the optical fiber amplifier according to the present invention.

FIG. 4 verifies that the above configuration of this example allows the gains of the first and second signals to be equalized. The x axis of FIG. 4 represents the input power of the 1.53 μm signal into the optical fiber amplifier, and the y axis represents the gain of the 1.53 μm signal. In FIG. 4, the □ mark denotes the gain of the 1.53 μm signal when the erbium-doped optical fiber 33 is not provided. The ○ mark denotes the gain of the 1.53 μm signal when the erbium-doped optical fiber 33 is provided. The gain of the 1.56 μm signal is also shown as the ● mark for reference. The input power of the 1.56 μm signal is fixed at +5 dBm.

It is observed from FIG. 4 that the gain ○ of the 1.53 μm signal and the gain ● of the 1.56 μm signal are substantially the same for the input power of the 1.53 μm signal in the range of −40 to −20 dBm. This is because the 1.53 μm signal were additionally amplified by the erbium-doped optical fiber 33 after being amplified by the erbium-doped optical fiber 32, as described above. This result clearly shows the effect of the present invention that the gains of the first and second signals can be substantially equalized.

EXAMPLE 2

Figure 5:
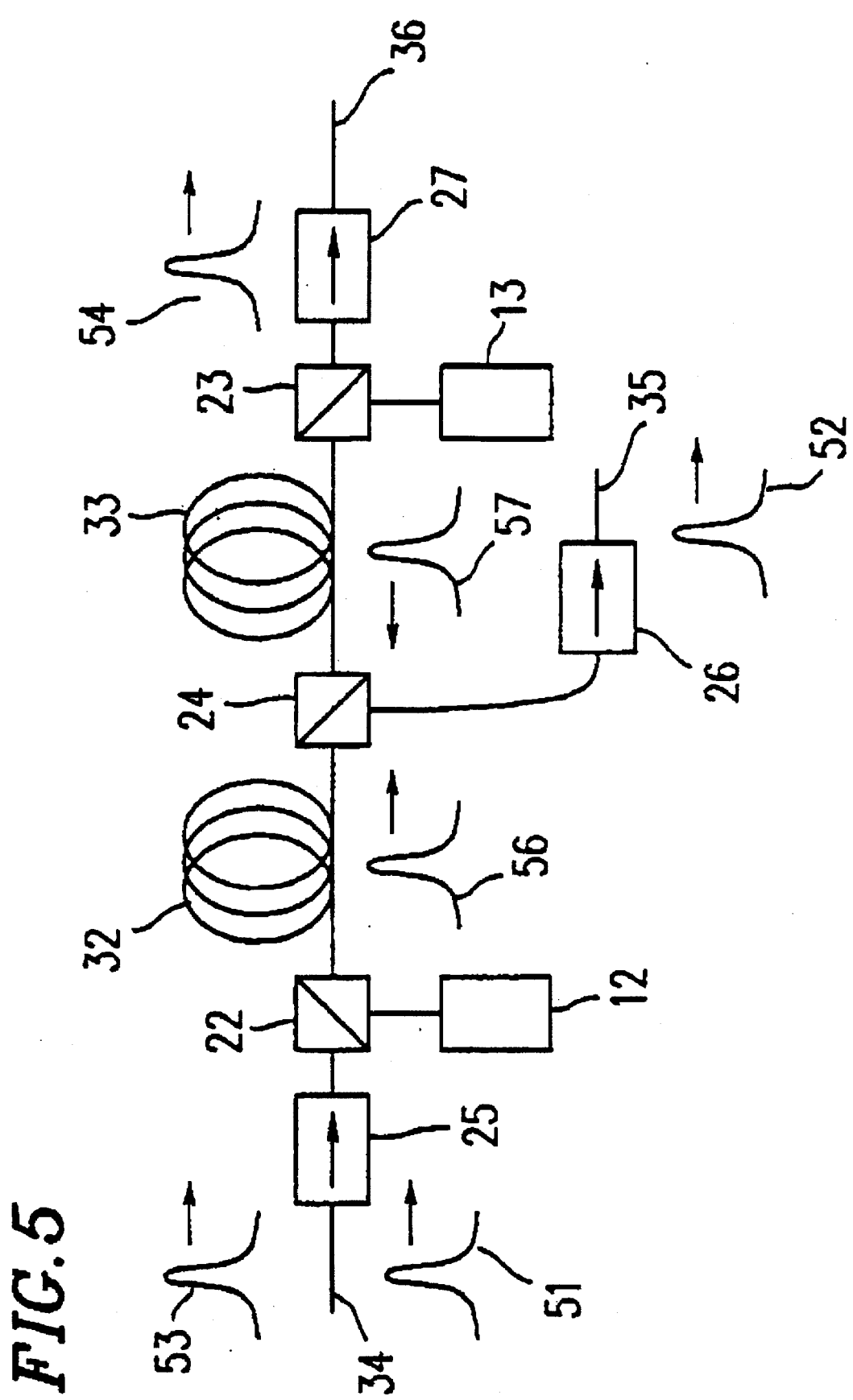
FIG. 5 shows a configuration of a second example of the optical fiber amplifier according to the present invention.

Referring to FIG. 5, a second example of the optical fiber amplifier according to the present invention will be described in detail. In FIG. 5, components corresponding to those described in Example 1 are shown by the same reference numerals.

The difference of the optical fiber amplifier of this example from the optical fiber amplifier shown in FIG. 1 is as follows: The optical fiber amplifier of this example further includes a 1.48 μm pump laser diode 13 as a second pump light source and a WDM coupler 23 for allowing pump light 57 emitted from the pump laser diode 13 to enter the erbium-doped optical fiber 33. The WDM coupler 23 is disposed between the erbium-doped optical fiber 33 and the optical isolator 27. The WDM coupler 23 couples or separates 1.48 μm light with or from 1.55 μm light.

The operation of the optical fiber amplifier with the above configuration when two signals are input thereinto will be described.

A first 1.56 μm signal 51 and a second 1.53 μm signal 53 are input into the optical fiber amplifier through an optical fiber 34. The first and second signals 51 and 53 are coupled with pump light 56 by a WDM coupler 22, and then input into an erbium-doped optical fiber 32. The pump light 56 thus amplifies the signals 51 and 53. After the transmission through the erbium-doped optical fiber 32, attenuated transmitted components of the pump light 56 are input into an erbium-doped optical fiber 33 through a WDM coupler 24. The first 1.56 μm signal 51 is separated from the second signal 53 and passes through an optical isolator 26 to be output from the optical fiber amplifier as an amplified first signal 52. The second 1.53 µm signal 53 passes through the WDM coupler 24 and enters the erbium-doped optical fiber 33. The pump light 57 emitted from the laser diode 13 is coupled with the second signal 53 by the WDM coupler 23, and then enters the erbium-doped optical fiber 33, where the second 1.53 µm signal 53 is further amplified by the transmitted pump light 56 and the pump light 57. Then, the amplified second 1.53 µm signal 53 is output from the optical fiber amplifier through an optical isolator 27 as an amplified second signal 54.

As is observed from FIG. 3, when the input power of the first signal is as large as several dBm, the power of the transmitted pump light is too small to be used for the additional exciting of the second signal. In such a case, the gains of signals with various wavelengths can be compensated by providing additional pump light from downstream of the erbium-doped optical fiber 33.

EXAMPLE 3

Figure 6:
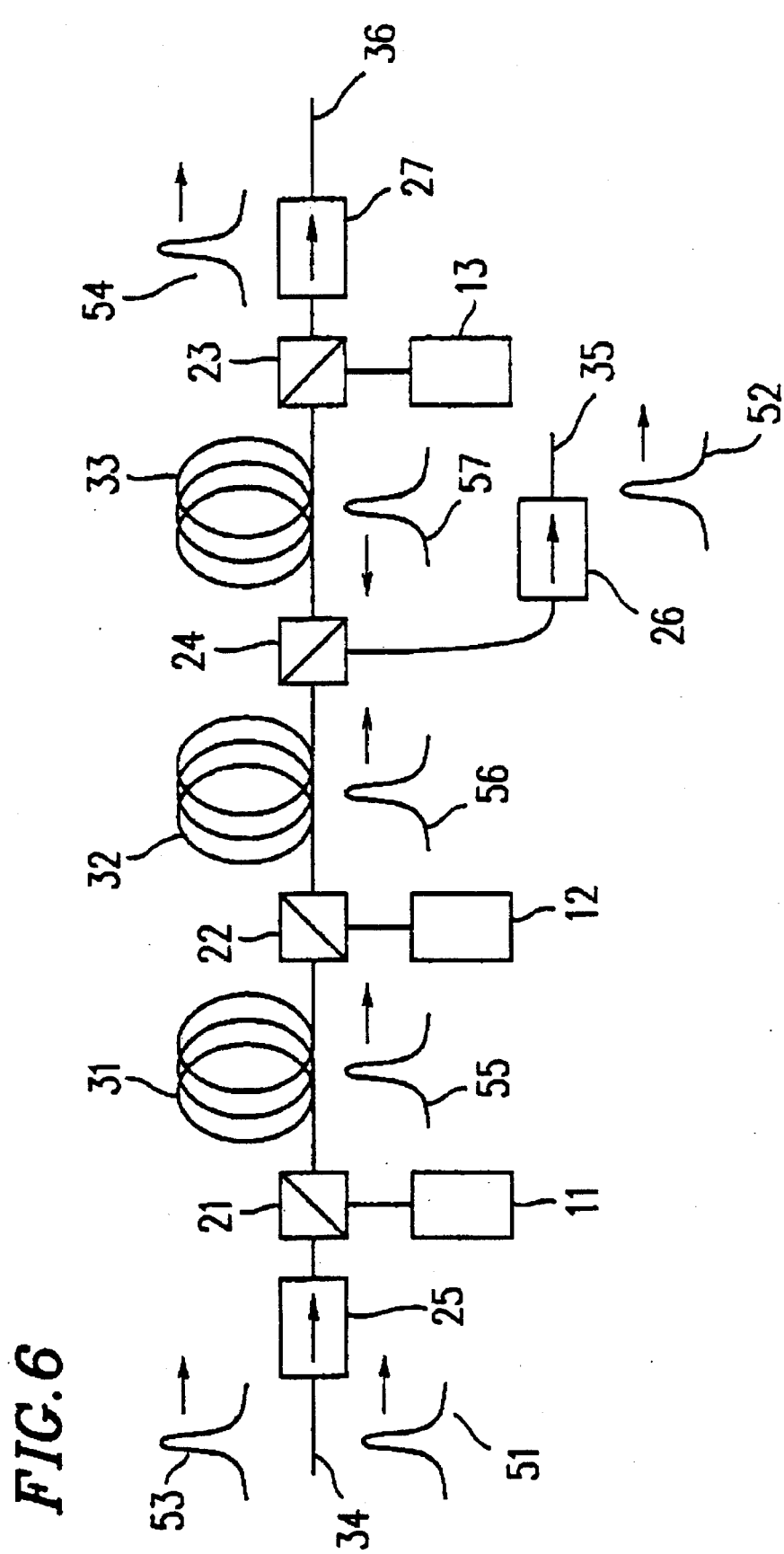
FIG. 6 shows a configuration of a third example of the optical fiber amplifier according to the present invention.

Referring to FIG. 6, a third example of the optical fiber amplifier according to the present invention will be described in detail. In FIG. 6, components corresponding to those described in the previous examples are shown by the same reference numerals.

The difference of the optical fiber amplifier of this example from the optical fiber amplifier shown in FIG. 5 is as follows: The optical fiber amplifier of this example further includes an erbium-doped optical fiber 31, a pump laser diode 11, and a WDM coupler 21. The pump laser diode 11 emits 0.98 µm pump light 55. The WDM coupler 21 couples or separates 0.98 µm light with or from 1.55 µm light.

The operation of the optical fiber amplifier with the above configuration when two signals are input therein will be described.

A first 1.56 µm signal 51 and a second 1.53 µm signal 53 are input into the optical fiber amplifier through an optical fiber 34. The first and second signals 51 and 53 are coupled with the pump light 55 by the WDM coupler 21, and then input into the erbium-doped optical fiber 31. The signals 51 and 53 amplified by the pump light 55 then passes through a WDM coupler 22 where they are coupled with pump light 56, and are input into an erbium-doped optical fiber 32. The pump light 56 thus amplifies the signals 51 and 53. After the transmission through the erbium-doped optical fiber 32, attenuated transmitted components of the pump light 56 are input into an erbium-doped optical fiber 33 through a WDM coupler 24. The first 1.56 µm signal 51 is separated from the second signal 53 and passes through an optical isolator 26 to be output from the optical fiber amplifier as an amplified first signal 52. The second 1.53 µm signal 53 passes through the WDM coupler 24 and enters the erbium-doped optical fiber 33. Pump light 57 emitted from a laser diode 13 is coupled with the second signal 53 by the WDM coupler 23, and then enters the erbium-doped optical fiber 33, where the second 1.53 µm signal 53 is further amplified by the transmitted pump light 56 and the pump light 57. Then, the amplified second 1.53 µm signal 53 is output from the optical fiber amplifier through an optical isolator 27 as an amplified second signal 54.

When a plurality of signals with different wavelengths are input, the noise figure degrades as the total input power increases. In such a case, noise can be minimized by exciting the signal by the 0.98 µm pump light at an input section of the optical fiber amplifier. The noise figure may degrade if the signal is simultaneously amplified by the 0.98 µm pump light and the 1.48 µm pump light. According to the configuration of this example, however, this problem does not arise because the 1.48 µm pump light does not intrude the 0.98 µm pumped area.

EXAMPLE 4

Figure 7:
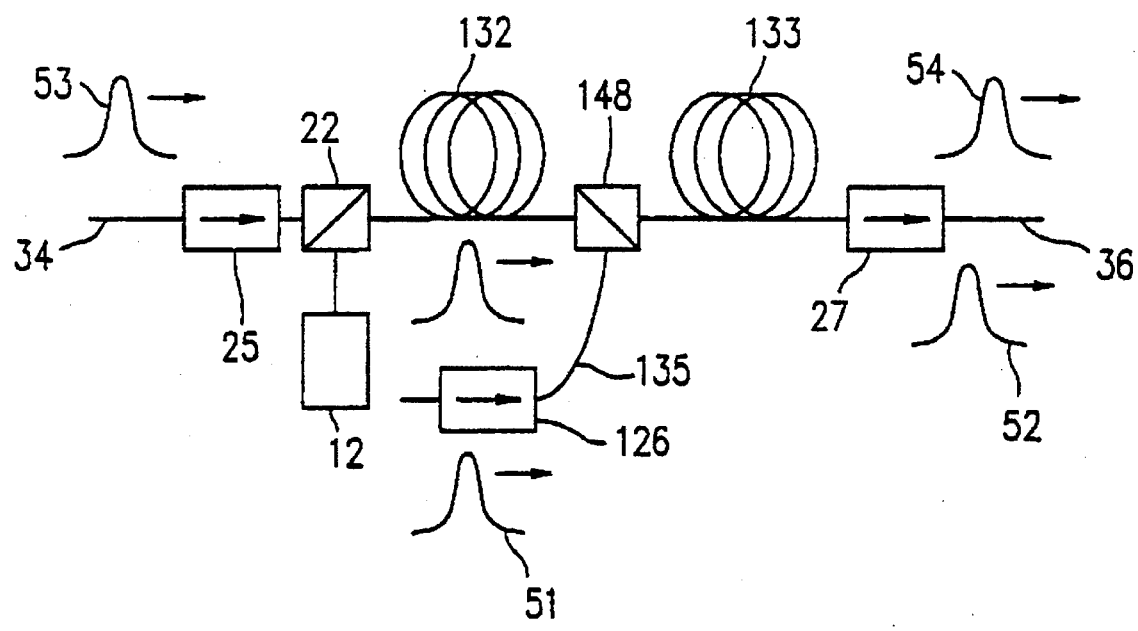
FIG. 7 shows a configuration of a fourth example of the optical fiber amplifier according to the present invention.

Referring to FIG. 7, a fourth example of the optical fiber amplifier according to the present invention will be described in detail. In FIG. 7, components corresponding to those described in the previous examples are shown by the same reference numerals.

The optical fiber amplifier of this example includes two input ends for receiving a plurality of signals with different wavelengths, an amplifying section for optically amplifying the plurality of signals input through the input ends, and a single output end for outputting the plurality of amplified signals. In this example, a signal having a wavelength of 1.56 µm modulated with an analog signal (a first signal 51) and a signal having a wavelength of 1.53 µm modulated with a digital signal (a second signal 53) are input through two different input ends, and amplified.

The amplifying section includes a first erbium-doped optical fiber 132 for amplifying only the second signal 53 and a second erbium-doped optical fiber 133 for amplifying both the first signal 51 and the second signal 53. The erbium-doped optical fibers 132 and 133 are connected via a WDM coupler 148. The WDM coupler 148 couples the second signal 53 which has propagated through the erbium-doped optical fiber 132 and the first signal 51 which has been input into the WDM coupler 148 through an optical fiber 135 and an optical isolator 126 inserted therein, and sends the coupled signal to the erbium-doped optical fiber 133.

The first and second signals 51 and 53 amplified while propagating in the erbium-doped optical fiber 133 are then output from the common output end through an optical fiber 36 and an optical isolator 27 inserted therein.

The amplifying section further includes a pump laser diode 12 which emits pump light (wavelength: 1.48 µm) for exciting the erbium-doped optical fibers 132 and 133. The second signal 53 is input into a WDM coupler 22 through an optical fiber 34 and an optical isolator 25 inserted therein. The second 1.53 µm signal 53 is coupled with the 1.48 µm pump light by the WDM coupler 22, and the coupled light is input into the erbium-doped optical fiber 132. Components of 1.48 µm pump light which have passed through the erbium-doped optical fiber 132 is then input into the erbium-doped optical fiber 133 through the WDM coupler 148 so as to pump the erbium-doped optical fiber 133.

EXAMPLE 5

Figure 8:
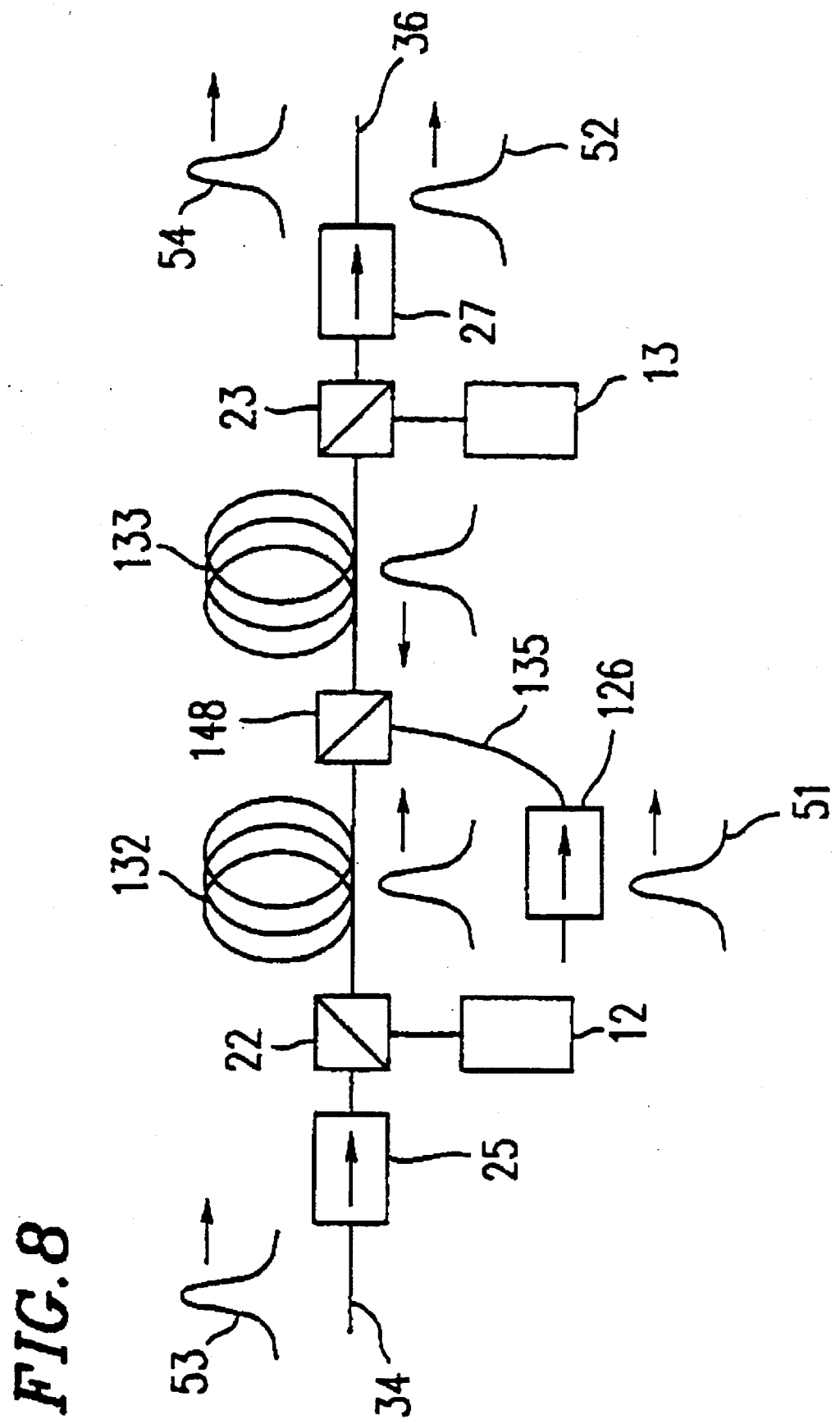
FIG. 8 shows a configuration of a fifth example of the optical fiber amplifier according to the present invention.

Referring to FIG. 8, a fifth example of the optical fiber amplifier according to the present invention will be described in detail. In FIG. 8, components corresponding to those described in the previous examples are shown by the same reference numerals.

The difference of the optical fiber amplifier of this example from the optical fiber amplifier shown in FIG. 7 is as follows: The optical fiber amplifier of this example further includes a 1.48 µm pump laser diode 13 as a second pump light source and a WDM coupler 23 for allowing pump light emitted from the pump laser diode 13 to enter the erbium-doped optical fiber 133. The WDM coupler 23 is disposed between the erbium-doped optical fiber 133 and an optical isolator 27. The WDM coupler 23 couples or separates 1.48 µm light with or from 1.55 µm light.

EXAMPLE 6

Figure 9:
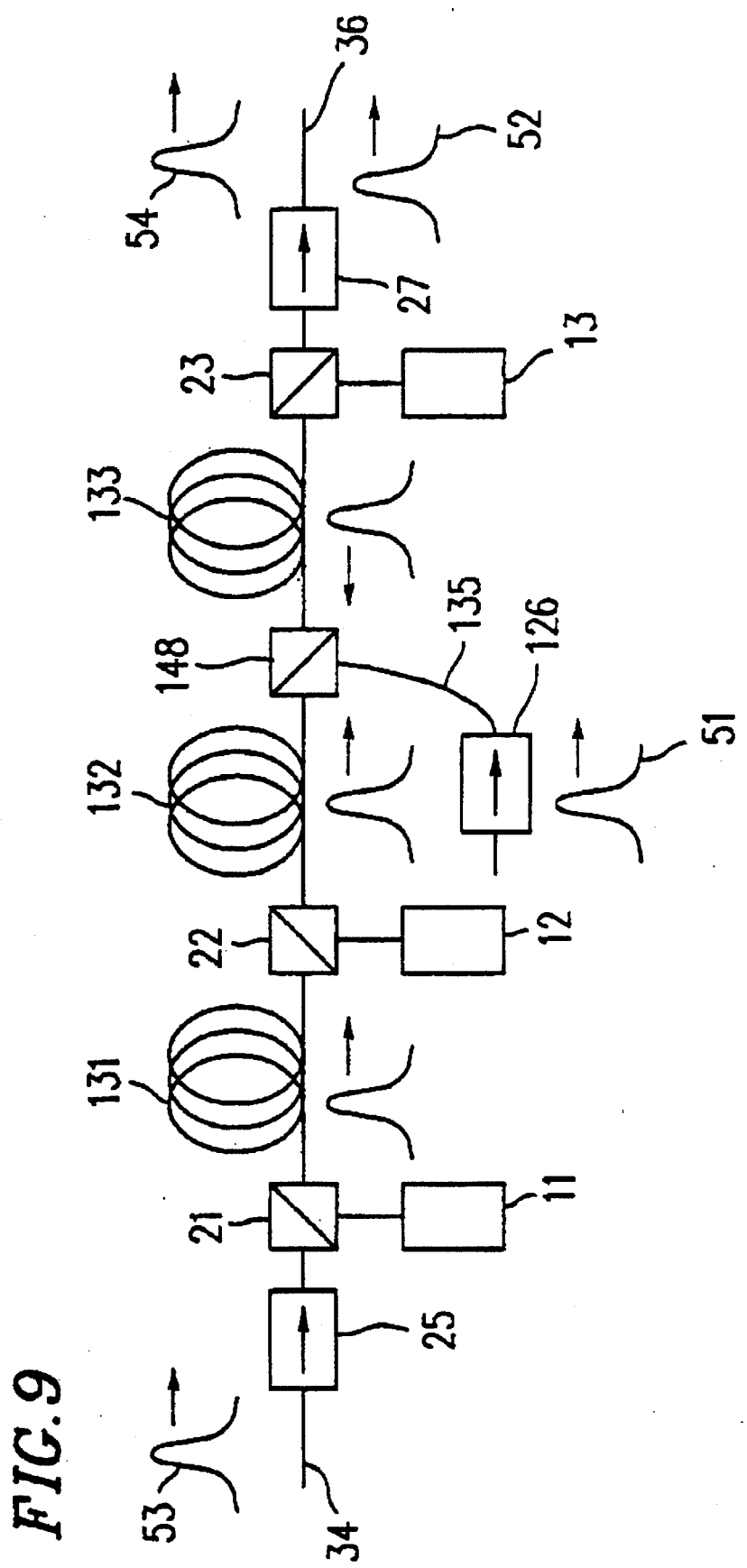
FIG. 9 shows a configuration of a sixth example of the optical fiber amplifier according to the present invention.

Referring to FIG. 9, a sixth example of the optical fiber amplifier according to the present invention will be described in detail. In FIG. 9, components corresponding to those described in the previous examples are shown by the same reference numerals.

The difference of the optical fiber amplifier of this example from the optical fiber amplifier shown in FIG. 8 is as follows: The optical fiber amplifier of this example further includes an erbium-doped optical fiber 131, a pump laser diode 11, and a WDM coupler 21. The pump laser diode 11 emits 0.98 µm pump light. The WDM coupler 21 couples or separates 0.98 µm light with or from 1.55 µm light.

EXAMPLE 7

Figure 10:
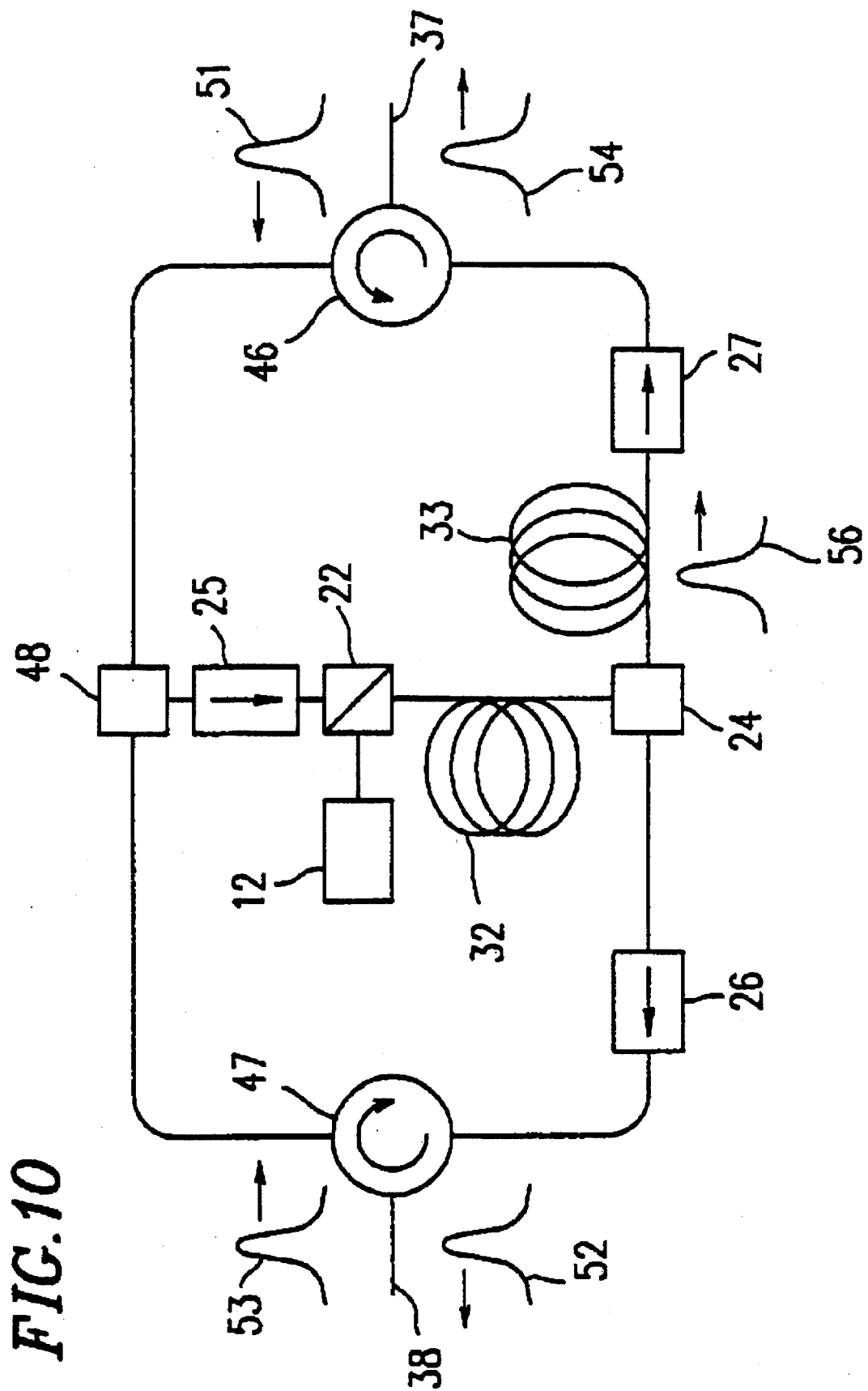
FIG. 10 shows a configuration of a first example of the bidirectional optical fiber amplifier according to the present invention.

Referring to FIG. 10, a first example of the bidirectional optical fiber amplifier according to the present invention will be described in detail. In FIG. 10, components corresponding to those described in the previous examples are shown by the same reference numerals.

An optical amplifying section of the bidirectional optical fiber amplifier of this example includes, as in Example 1, a 1.48 µm pump laser diode 12, a WDM coupler 22 for 1.48 µm light and 1.55 µm light, a WDM coupler 24 for light with a wavelength of less than 1.55 µm and 1.55 µm light, optical isolators 25, 26 and 27, and erbium-doped optical fibers 32 and 33. The bidirectional optical fiber amplifier further includes optical circulators 46 and 47, a WDM coupler 48, and optical fibers 37 and 38, so as to constitute a section for multiplexing/division of bidirectional signals.

A first signal input into the optical fiber 37 is denoted by the reference numeral 51, while the amplified first signal output from the optical fiber 38 is denoted by the reference numeral 52. A second signal input into the optical fiber 38 is denoted by the reference numeral 53, while the amplified second signal output from the optical fiber 37 is denoted by the reference numeral 54.

The operation of this bidirectional optical fiber amplifier when two signals are input thereinto will be described.

The first signal 51 is input through the input end of the optical fiber 37, and enters the optical circulator 46. The optical circulator 46 operates to allow only the signal sent from the optical fiber 37 to enter the WDM coupler 48. The first signal 51 input into the WDM coupler 48 is coupled with the second signal 53 by the WDM coupler 48 and then transmitted to the erbium-doped optical fiber 32 through the optical isolator 25.

The first signal 51 is separated from the second signal 53 and directed to propagate only toward the optical circulator 47 by the WDM coupler 24. When input into the optical circulator 47, the first signal 51 is forced into the optical fiber 38 by the optical circulator 47, and then output from the optical fiber 38 as the amplified first signal 52.

The second 1.53 µm signal 53 is input through the input end of the optical fiber 38, and enters the optical circulator 47. Thereafter, the second signal 53 is coupled with the first 1.56 µm signal 51 by the WDM coupler 48, and then amplified in the erbium-doped optical fibers 32 and 33. The amplified second signal 53 is input into the optical circulator 46, and forced into the optical fiber 37 by the optical circulator 46, so as to be output therefrom as the amplified second signal 54.

In this example, the optical fiber amplifier shown in FIG. 1 is employed for the optical amplification. Accordingly, a bidirectional optical fiber amplifier capable of equalizing the gains of the signals amplified bidirectionally can be obtained.

EXAMPLE 8

Figure 11:
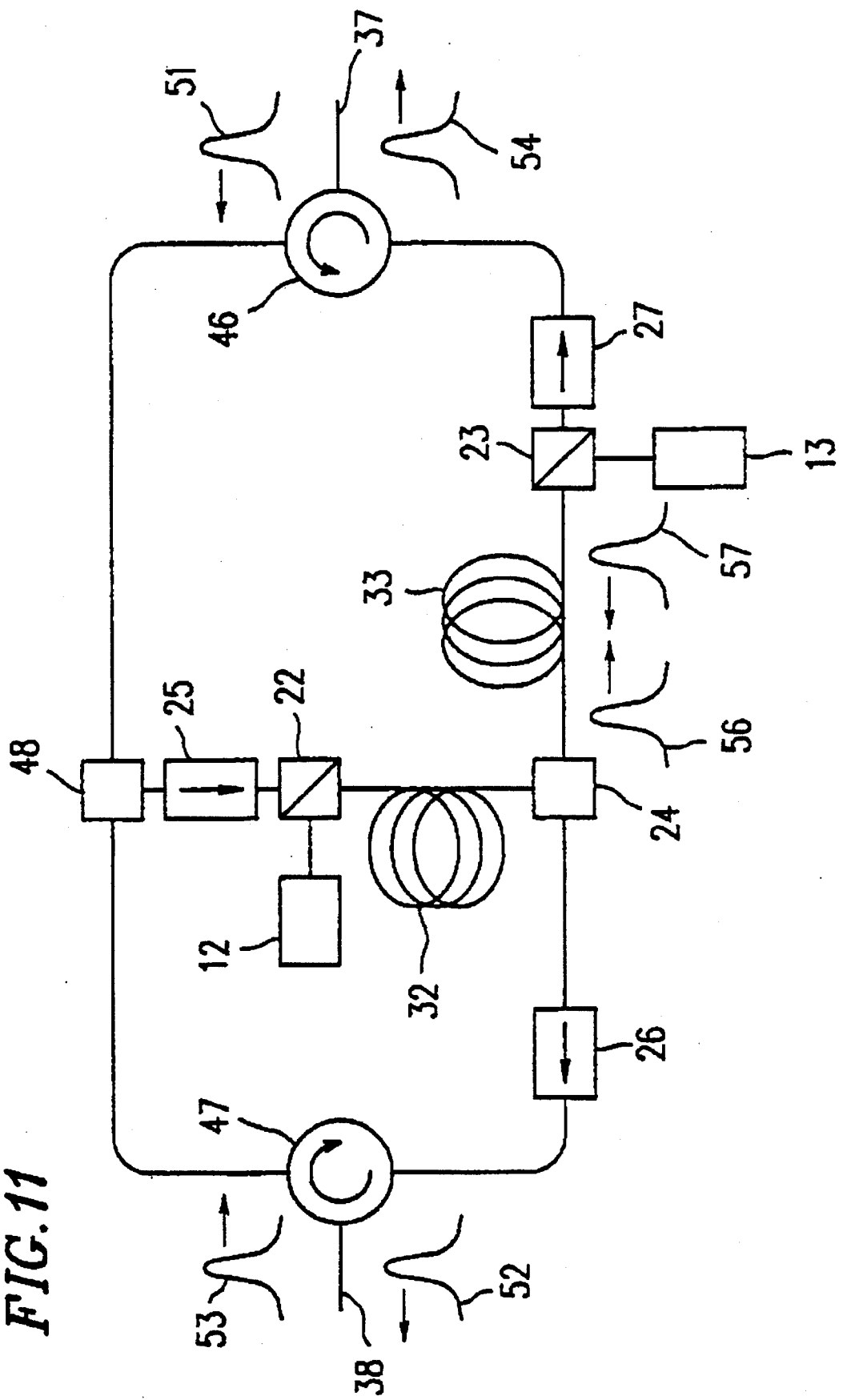
FIG. 11 shows a configuration of a second example of the bidirectional optical fiber amplifier according to the present invention.

Referring to FIG. 11, a second example of the bidirectional optical fiber amplifier according to the present invention will be described in detail. In FIG. 11, components corresponding to those described in the previous examples are shown by the same reference numerals. 15 An optical amplifying section of the bidirectional optical fiber amplifier of this example includes, as in Example 2, 1.48 µm pump laser diodes 12 and 13, WDM couplers 22 and 23 for 1.48 µm light and 1.55 µm light, a WDM coupler 24 for light with a wavelength of less than 1.55 µm and 1.55 µm light, optical isolators 25, 26 and 27, and erbium-doped optical fibers 32 and 33. The bidirectional optical fiber amplifier further includes optical circulators 46 and 47, a WDM coupler 48, and optical fibers 37 and 38, so as to constitute a section for multiplexing/division of bidirectional signals.

A first signal input into the optical fiber 37 is denoted by the reference numeral 51, while the amplified first signal output from the optical fiber 38 is denoted by the reference numeral 52. A second signal input into the optical fiber 38 is denoted by the reference numeral 53, while the amplified second signal output from the optical fiber 37 is denoted by the reference numeral 54.

The operation of the bidirectional optical fiber amplifier with the above configuration when two signals are input thereinto will be described.

The first signal 51 is input through the input end of the optical fiber 37, and enters the optical circulator 46. The optical circulator 46 operates to allow only the signal sent from the optical fiber 37 to enter the WDM coupler 48. The first signal 51 is coupled with the second signal 53 by the WDM coupler 48 and then transmitted to the erbium-doped optical fiber 32.

The first signal 51 is separated from the second signal 53 and directed to propagate only toward the optical circulator 47 by the WDM coupler 24. When input into the optical circulator 47, the first signal 51 is forced into the optical fiber 38 by the optical circulator 47, and then output from the optical fiber 38 as the amplified first signal 52.

The second 1.53 µm signal 53 is input through the input end of the optical fiber 38, and enters the optical circulator 47. Thereafter, the second signal 53 is coupled with the first 1.56 µm signal 51 by the WDM coupler 48, and then amplified in the erbium-doped optical fibers 32 and 33. The amplified second signal 53 is input into the optical circulator 46, and forced into the optical fiber 37 by the optical circulator 46, so as to be output therefrom as the amplified second signal 54.

In this example, the optical fiber amplifier shown in FIG. 5 is employed for the optical amplification. Accordingly, a bidirectional optical fiber amplifier capable of equalizing the gains of the signals amplified bidirectionally can be obtained even when the input power is large.

EXAMPLE 9

Figure 12:
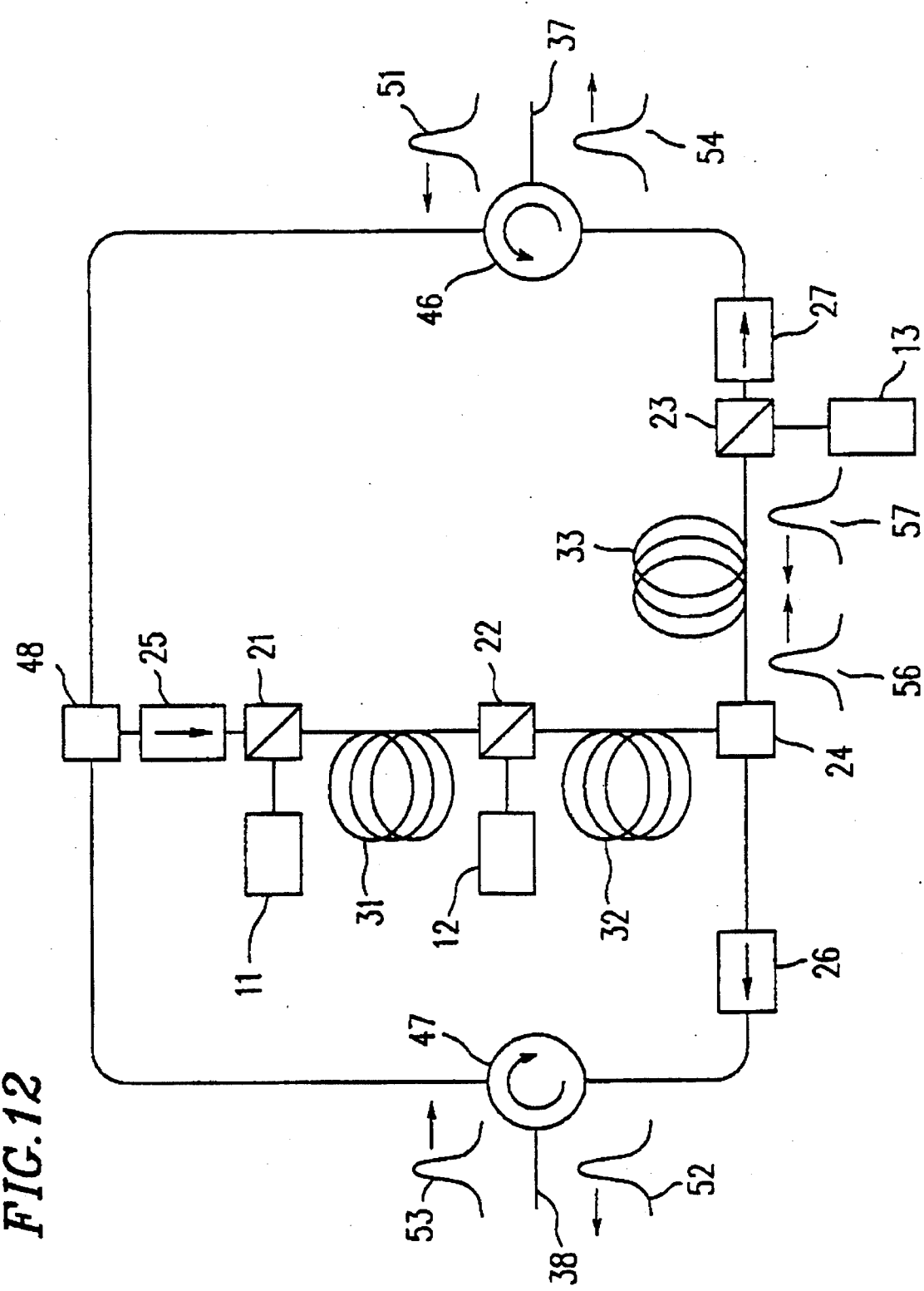
FIG. 12 shows a configuration of a third example of the bidirectional optical fiber amplifier according to the present invention.

Referring to FIG. 12, a third example of the bidirectional optical fiber amplifier according to the present invention will be described in detail. In FIG. 12, components corresponding to those described in the previous examples are shown by the same reference numerals.

An optical amplifying section of the bidirectional optical fiber amplifier of this example includes, as in Example 3, a 0.98 μm pump laser diode 11, 1.48 μm pump laser diodes 12 and 13, a WDM coupler 21 for 0.98 μm light and 1.55 μm light, WDM couplers 22 and 23 for 1.48 μm light and 1.55 μm light, a WDM coupler 24 for light with a wavelength of less than 1.55 μm and 1.55 μm light, optical isolators 25, 26 and 27, and erbium-doped optical fibers 31, 32 and 33. The bidirectional optical fiber amplifier further includes optical circulators 46 and 47, a WDM coupler 48, and optical fibers 37 and 38, so as to constitute a section for multiplexing/ division of bidirectional signals.

A first signal input into the optical fiber 37 is denoted by the reference numeral 51, while the amplified first signal output from the optical fiber 38 is denoted by the reference numeral 52. A second signal input into the optical fiber 38 is denoted by the reference numeral 53, while the amplified second signal output from the optical fiber 37 is denoted by the reference numeral 54.

The operation of the bidirectional optical fiber amplifier with the above configuration when two signals are input therein will be described.

The first signal 51 is input through the input end of the optical fiber 37, and enters the optical circulator 46. The optical circulator 46 operates to allow only the signal sent from the optical fiber 37 to enter the WDM coupler 48. The first signal 51 is coupled with the second signal 53 by the WDM coupler 48 and then transmitted to the erbium-doped optical fiber 31.

The first signal 51 is directed to propagate only toward the optical circulator 47 by the WDM coupler 24. When input into the optical circulator 47, the first signal 51 is forced into the optical fiber 38 by the optical circulator 47, and then output from the optical fiber 38 as the amplified first signal 52.

The second 1.53 μm signal 53 is input through the input end of the optical fiber 38, and enters the optical circulator 47. Thereafter, the second signal 53 is coupled with the first 1.56 μm signal 51 by the WDM coupler 48, and then amplified in the erbium-doped optical fibers 31, 32 and 33. The amplified second signal 53 is input into the optical circulator 46, and forced into the optical fiber 37 by the optical circulator 46, so as to be output therefrom as the amplified second signal 54.

In this example, the optical fiber amplifier shown in FIG. 6 is employed for the optical amplification. Accordingly, a bidirectional optical fiber amplifier capable of equalizing the gains of the signals amplified bidirectionally and providing a good noise figure can be obtained even when the total input power of all signals is large.

EXAMPLE 10

Figure 13:
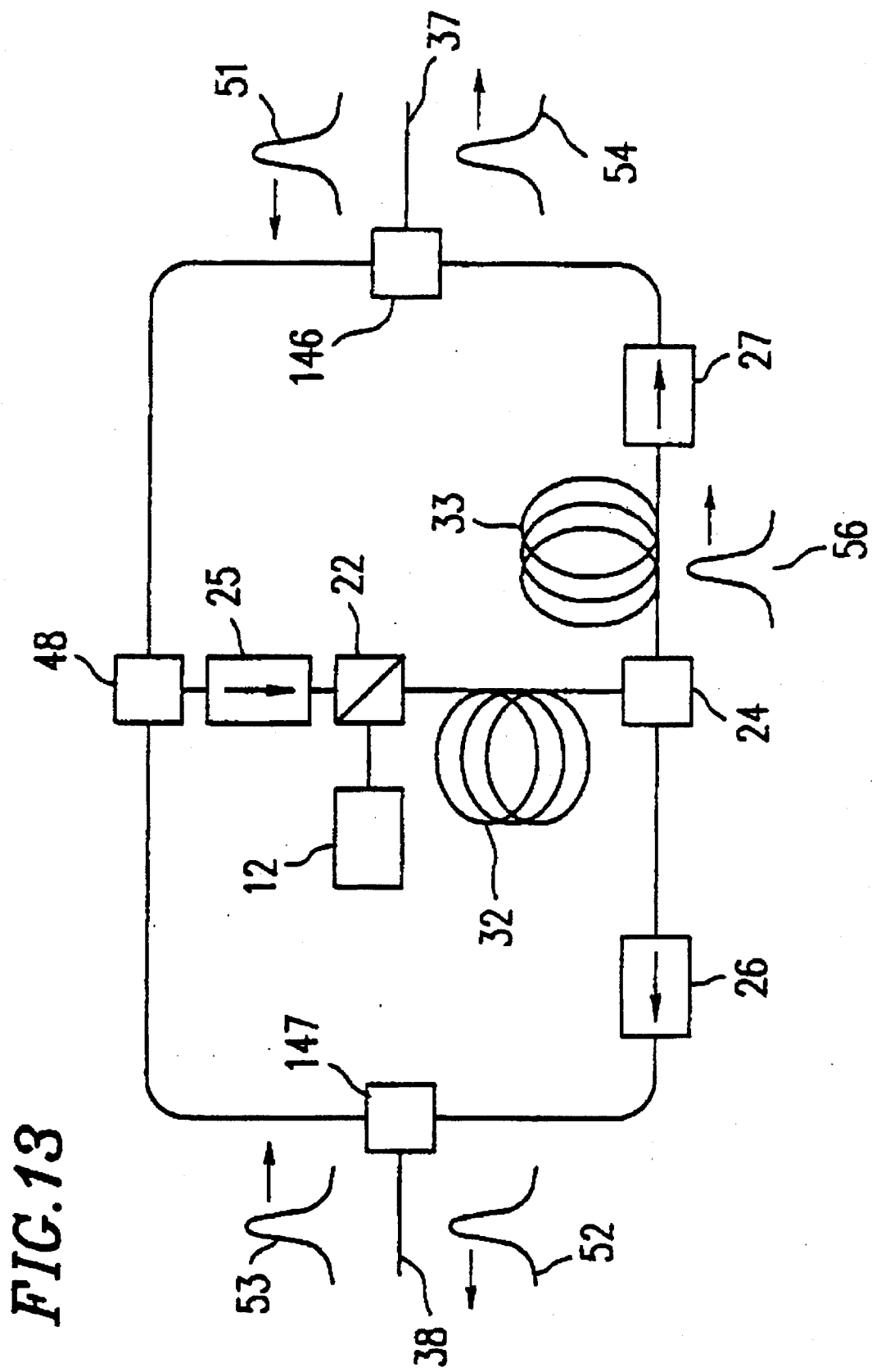
FIG. 13 shows a configuration of a fourth example of the bidirectional optical fiber amplifier according to the present invention.

Referring to FIG. 13, a fourth example of the bidirectional optical fiber amplifier according to the present invention will be described in detail. FIG. 13, components corresponding to those described in the previous examples are shown by the same reference numerals.

The difference of the bidirectional optical fiber amplifier of this example from the bidirectional optical fiber amplifier of Example 7 shown in FIG. 10 is as follows: The bidirectional optical fiber amplifier of this example uses WDM coupler 146 and 147, in place of the optical circulators 46 and 47.

The WDM couplers 146 and 147 may also be used in place of the optical circulators 46 and 47 for the bidirectional optical fiber amplifiers of Examples 8 and 9 shown in FIGS. 11 and 12.

EXAMPLE 11

Figure 14:
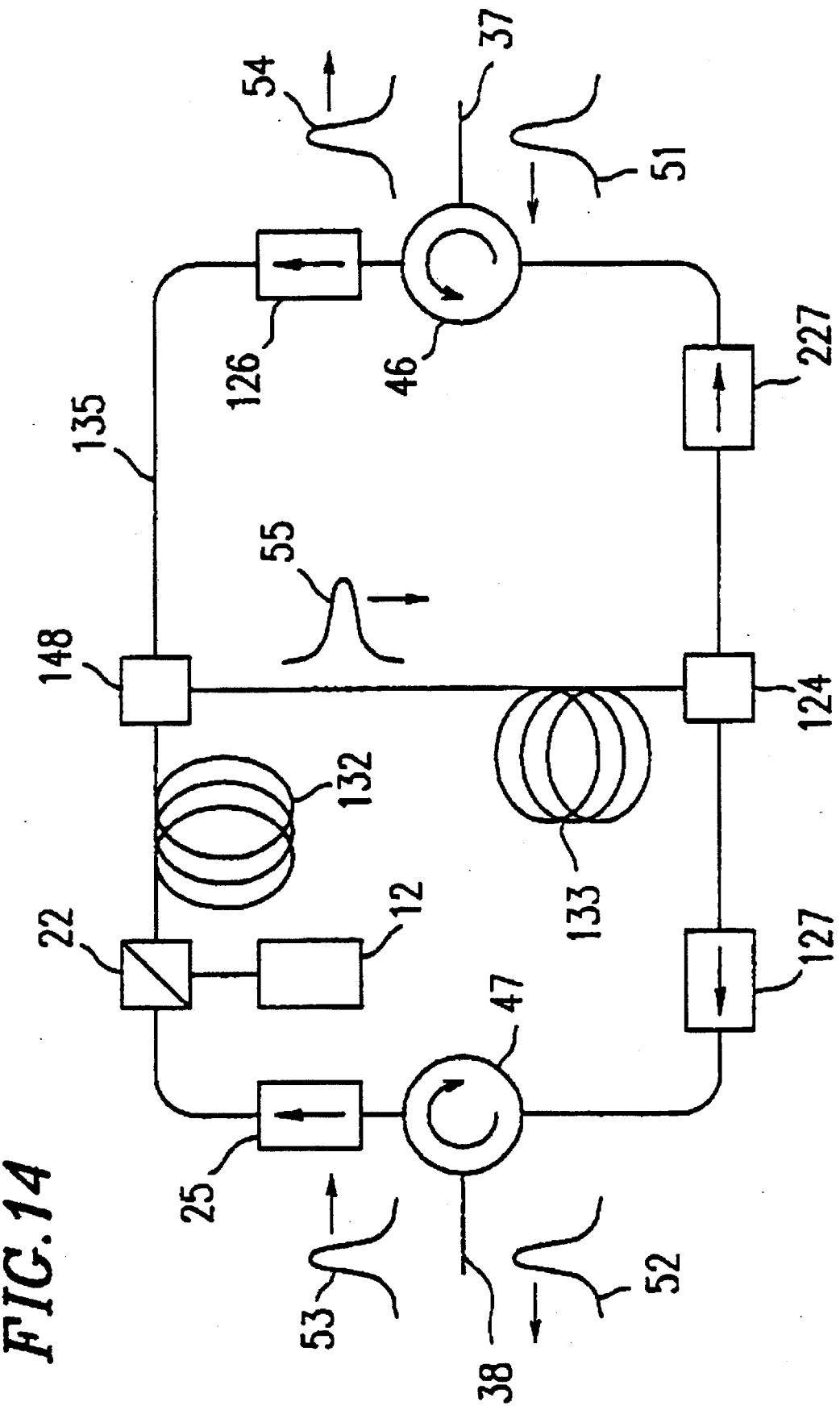
FIG. 14 shows a configuration of a fifth example of the bidirectional optical fiber amplifier according to the present invention.

Referring to FIG. 14, a fifth example of the bidirectional optical fiber amplifier according to the present invention will be described in detail. In FIG. 14, components corresponding to those described in the previous examples are shown by the same reference numerals.

An optical amplifying section of the bidirectional optical fiber amplifier of this example includes, as in Example 4, a 1.48 μm pump laser diode 12, a WDM coupler 22 for 1.48 μm light and 1.53 μm light, WDM couplers 124 and 148 for light with a wavelength of less than 1.55 μm and 1.55 μm light, optical isolators 25, 126, 127 and 227, and erbium-doped optical fibers 132, and 133. The bidirectional optical fiber amplifier further includes optical circulators 46 and 47, and optical fibers 37 and 38, so as to constitute a section for multiplexing/division of bidirectional signals.

A first signal input into the optical fiber 37 is denoted by the reference numeral 51, while the amplified first signal output from the optical fiber 38 is denoted by the reference numeral 52. A second signal input into the optical fiber 38 is denoted by the reference numeral 53, while the amplified second signal output from the optical fiber 37 is denoted by the reference numeral 54.

The operation of the bidirectional optical fiber amplifier with the above configuration when two signals are input thereinto will be described.

The first signal 51 is input through the input end of the optical fiber 37, and enters the optical circulator 46. The optical circulator 46 operates to allow only the signal sent from the optical fiber 37 to enter the WDM coupler 148. The first signal 51 is coupled with the second signal 53 by the WDM coupler 148 and then transmitted to the erbium-doped optical fiber 133.

The first signal 51 amplified by the erbium-doped optical fiber 133 is directed to propagate only toward the optical circulator 47 through the optical isolator 127 by the WDM coupler 124. When input into the optical circulator 47, the first signal 51 is forced into the optical fiber 38 by the optical circulator 47, and then output from the optical fiber 38 as the amplified first signal 52.

The second 1.53 μm signal 53 is input through the input end of the optical fiber 38, and enters the optical circulator 47. Thereafter, the second signal 53 is coupled with pump light emitted from the pump laser diode 12 by the WDM coupler 22 and input into the erbium-doped optical fiber 132. The amplified second signal 53 is coupled with the first 1.53 μm signal 51 by the WDM coupler 148, and then further amplified in the erbium-doped optical fiber 133. The amplified second signal 53 is forced to separate from the first signal 51 by the WDM coupler 124 so as to propagate toward the optical circulator 46 through the optical isolator 227. Then, the amplified second signal 53 is forced into the optical fiber 37 by the optical circulator 46, so as to be output therefrom as the amplified second signal 54.

EXAMPLE 12

Figure 15:
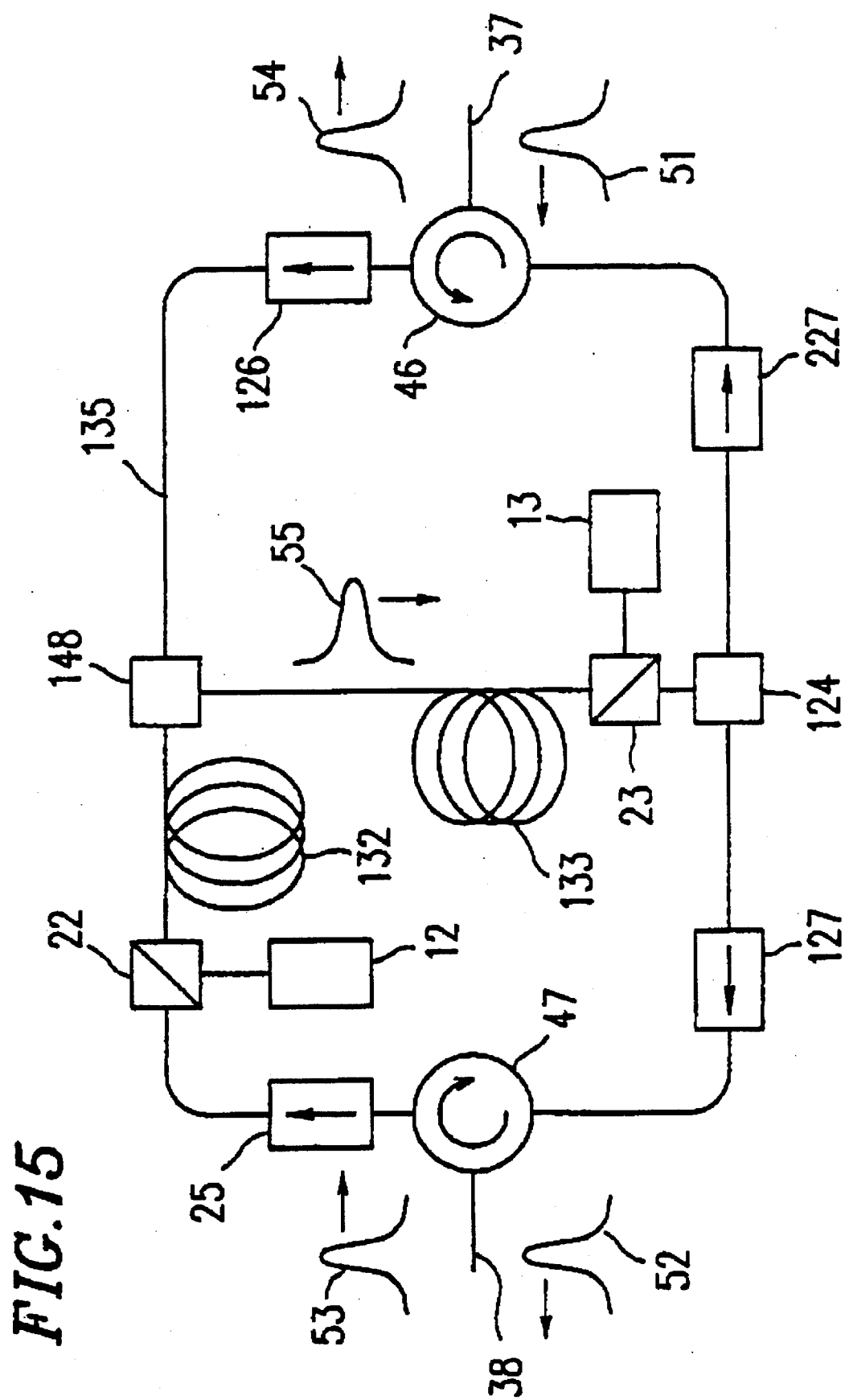
FIG. 15 shows a configuration of a sixth example of the bidirectional optical fiber amplifier according to the present invention.

Referring to FIG. 15, a sixth example of the bidirectional optical fiber amplifier according to the present invention will be described in detail. In FIG. 15, components corresponding to those described in the previous examples are shown by the same reference numerals.

The difference of the bidirectional optical fiber amplifier of this example from the bidirectional optical fiber amplifier of Example 11 shown in FIG. 14 is as follows: The bidirectional optical fiber amplifier of this example further includes a 1.48 μm pump laser diode 13 as a second pump light source and a WDM coupler 23 for allowing pump light emitted from the pump laser diode 13 to enter an erbium-doped optical fiber 133. The WDM coupler 23 is disposed between the erbium-doped optical fiber 133 and an optical isolator 127. The WDM coupler 23 couples or separates 1.48 μm light with or from 1.55 μm light.

EXAMPLE 13

Figure 16:
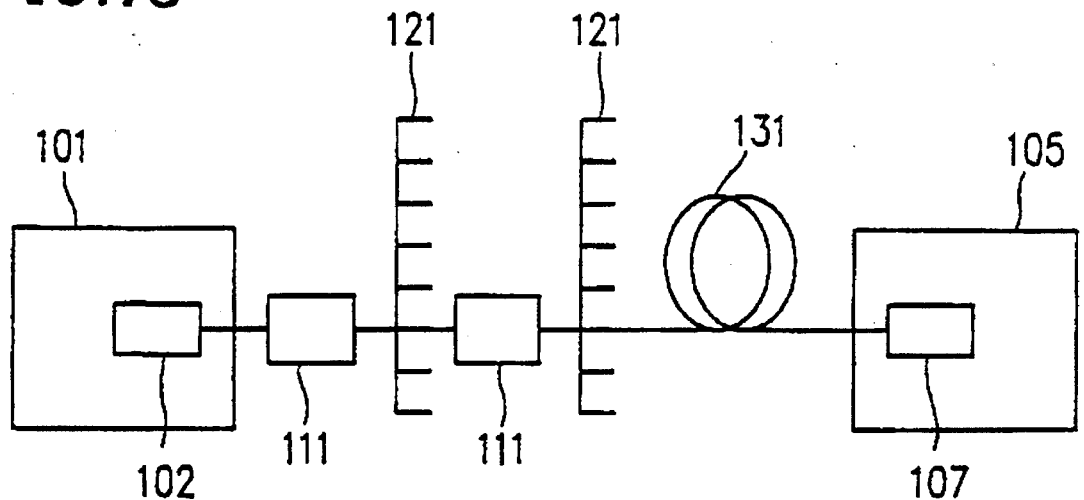
FIG. 16 shows a configuration of an example of an optical fiber transmission system according to the present invention.

Referring to FIG. 16, an example of the optical fiber transmission system according to the present invention will be described.

The optical fiber transmission system includes a transmitting station 101 and a subscriber 105. The transmitting station 101 includes a signal light source 102, and the subscriber 105 includes a light receiver 107. The transmitting station 101 and the subscriber 105 are connected via a transmission route 131. Optical fiber amplifiers 111 which have the same configuration as that of Example 1 and 1×8 optical splitters 121 are disposed at positions on the transmission route 131.

In the transmitting station 101, a 1.56 μm laser diode as the signal light source 102 emits light intensity-modulated with an analog signal. The output light is amplified by the optical fiber amplifiers 111 and transmitted through a 10 km long single-mode optical fiber as the transmission route 131. The analog signal is finally received by an pin-PD as the light receiver 107 in the subscriber 105.

Any of the optical fiber amplifiers according to the present invention can be used as the optical fiber amplifier 111. In this example, since the gains of the signals can be equalized, the powers of the received signals do not vary even when the number of optical fiber amplifiers disposed on the transmission route is increased. Thus, stable characteristics are obtained. In particular, the optical fiber amplifier shown in FIG. 5 makes it possible to equalize the gains of the signals even when the input power of the analog signal is large to improve the signal-to-noise ratio thereof. Accordingly, the number of optical fiber amplifiers can be increased with stable characteristics without causing inter-channel deviation in the light power received by the light receiver. Also, the optical fiber amplifier shown in FIG. 6, where the signal input section thereof is pumped by the 0.98 μm pump light, makes it possible to improve the noise figure even when the total input power of all signals is large.

EXAMPLE 14

Figure 17:
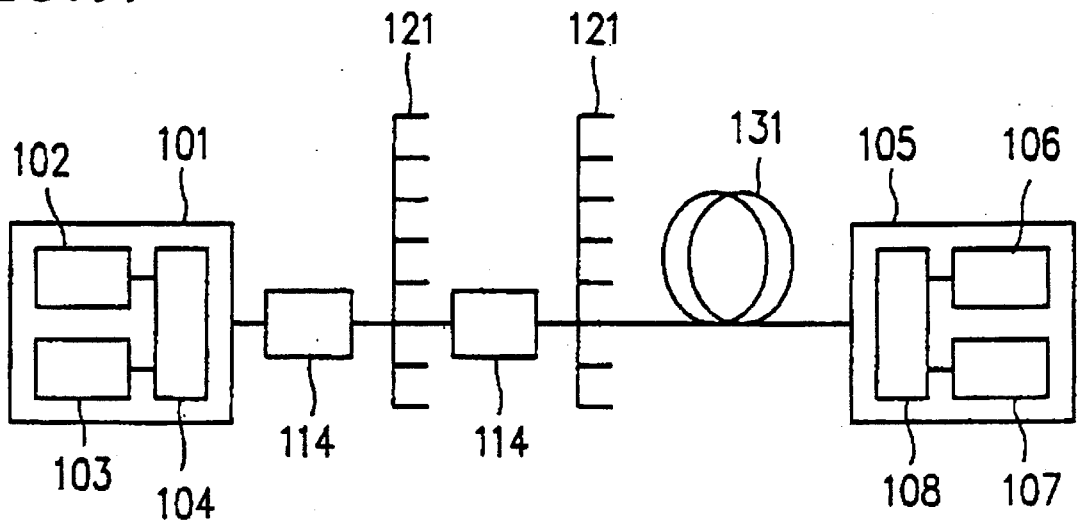
FIG. 17 shows a configuration of another example of an optical fiber transmission system according to the present invention.

Referring to FIG. 17, another example of the optical fiber transmission system according to the present invention will be described.

The optical fiber transmission system includes a transmitting station 101 and a subscriber 105. The transmitting station 101 includes a signal light source 102, a light receiver 103, and a WDM coupler 104. The subscriber 105 includes a signal light source 106, a light receiver 107, and a WDM coupler 108. The transmitting station 101 and the subscriber 105 are connected via a transmission route 131. Bidirectional optical fiber amplifiers 114 which have the same configuration as that of any of Examples 7 to 12 and 1×8 optical splitters 121 are disposed at appropriate positions on the transmission route 131.

Now, the case where an analog signal and a digital signal are transmitted and received by the optical fiber transmission system will be described. More specifically, the case where an analog signal is transmitted downstream to the subscriber and then a digital signal is transmitted upstream to the transmitting station will be described.

In the transmitting station 101, a 1.56 μm laser diode as the signal light source 102 emits light intensity-modulated with en analog signal. The light is output from the transmitting station 101 through the WDM coupler 104. Then, the light is amplified by the analog/digital bidirectional optical fiber amplifiers 114 and transmitted through a 10 km long single-mode optical fiber as the transmission route 131. The analog signal is finally received by an pin-PD as the light receiver 107 through the WDM coupler 108 in the subscriber 105.

In the subscriber 105, a 1.53 μm laser diode as the signal light source 106 emits light intensity-modulated with a digital signal. The light is coupled with 1.56 μm light by the WDM coupler 108 and output from the subscriber 105 to a 10 km long single-mode optical fiber as the transmission route 131. The digital signal is then amplified by the bidirectional optical fiber amplifiers 114 and reaches the transmitting station 101, where the digital signal is separated from the 1.56 μm light by the WDM coupler 104 so as to be received by a Ge-APD as the light receiver 103.

Thus, since the optical fiber transmission system of this example employs the bidirctional optical fiber amplifier according to the present invention, the gains of the signals propagating bidirectionally are equalized. Accordingly, the light powers received by the light receiver do not vary even when the number of optical fiber amplifiers is increased or when the signal light powers from the subscriber vary. Thus, stable characteristics can be obtained.

Since the optical fiber transmission system of this example employs the bidirectional optical fiber amplifier according to the present invention, the gains of the signals propagating bidirectionally are equalized even when the input power of the analog signal is large to improve the signal-to-noise ratio thereof. Accordingly, the light powers received by the light receiver do not vary even when the number of optical fiber amplifiers is increased or when the signal light powers from the subscriber vary. Thus, stable characteristics can be obtained.

Figure 18:
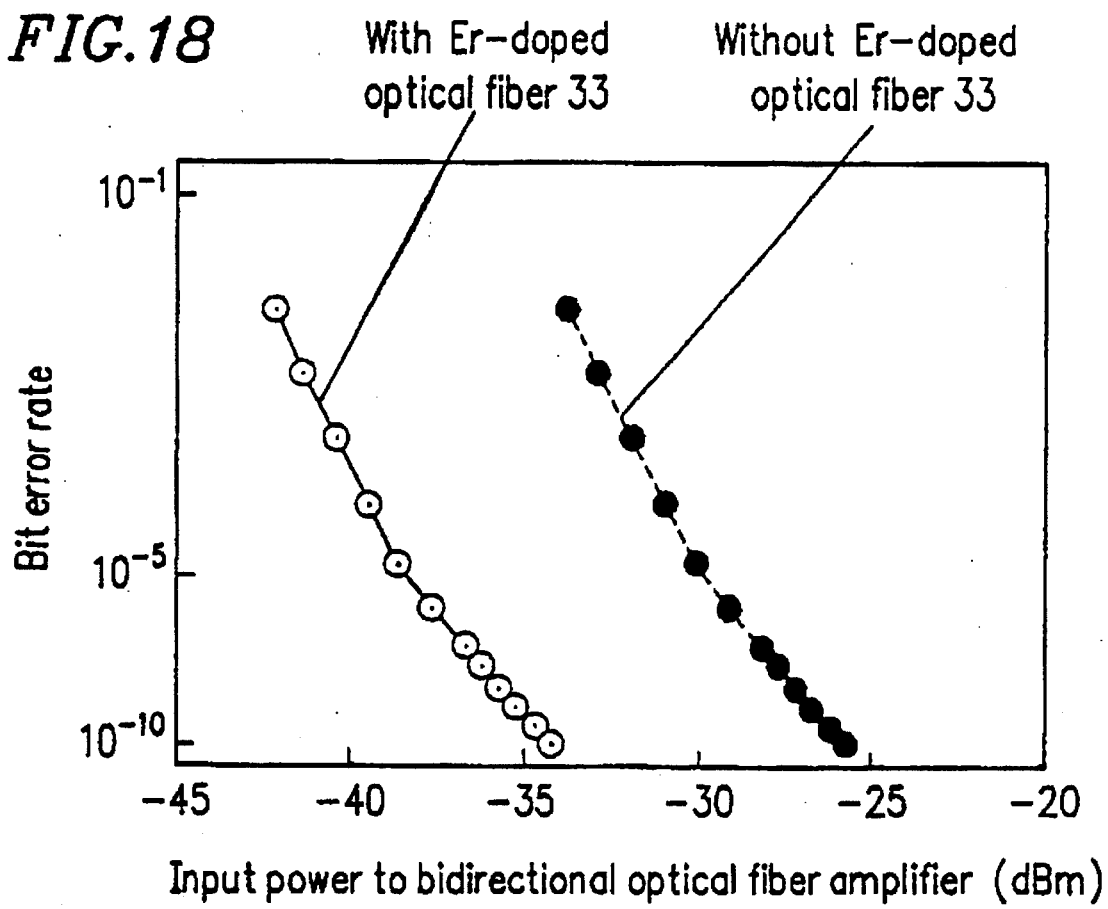
FIG. 18 shows the difference of the transmission characteristics of a 1.53 μm digital signal when a second erbium-doped optical fiber is provided in the bidirectional optical fiber amplifier according to the present invention and when it is not provided.

FIG. 18 shows the transmission characteristics of the 1.53 μm digital signal when the erbium-doped optical fiber 33 is provided in the bidirectional optical fiber amplifier 114 and when it is not provided. The transmission speed is 200 Mbps. As is observed from FIG. 18, when the erbium-doped optical fiber 33 is not provided, the minimum received light power which gives a bit error rate of $10^{-9}$ is −26 dBm. It is −35 dBm when the erbium-doped optical fiber 33 is provided, improving by 9 dBm. This indicates that the transmission characteristics can be improved by the bidirectional optical fiber transmission system according to the present invention.

As described above, by using the bidirectional optical fiber amplifier according to the present invention, the gains of signals propagating bidirectionally can be equalized. Accordingly, the light powers received by the light receivers do not vary even when the number of optical fiber amplifiers is increased or when the signal light powers from the subscriber vary. Thus, stable characteristics can be obtained. Further, when the signal input section of the optical fiber amplifier is excited by 0.98 μm pump light, a good noise figure can be obtained even when the total input power of all signals is large.

In this example, the bidirectional optical fiber amplifiers are disposed at positions closer to the transmitting station, acting as post amplifiers for the analog signal and as pre-amplifiers for the digital signal. However, the bidirectional optical fiber amplifier can be used as either a post amplifier, an in-line amplifier, or a pre-amplifier.

In this example, analog signals with a same wavelength were shown as the signals in a first wavelength band. However, a plurality of analog and/or digital signals with different wavelengths in the first wavelength band can be simultaneously transmitted. Likewise, naturally, a plurality of signals with different wavelengths can be simultaneously transmitted as the signals in a second wavelength band.

Signals in three or more wavelength bands can also be coupled with or separated from one another by the WDM couplers according to the present invention.

In the above examples, the erbium-doped optical fiber amplifier in the 1.5 μm band was used. The optical fiber amplifier of the present invention is not limited to the above, but other optical fiber amplifiers in other wavelength bands doped with ions of other rare earth elements such as neodymium and praseodymium can also be used to obtain the same effects as those described above.

In the above examples, the WDM couplers were used as multiplexers/dividers. However, any other types of multiplexers/dividers can also be used in place of the WDM couplers.

Thus, in the optical fiber amplifier according to the present invention, the gains of signals with different wavelengths can be equalized.

In the bidirectional optical fiber amplifier according to the present invention, signals with different wavelengths input from two different directions can be amplified while providing equal gains.

In the optical fiber transmission system according to the present invention, the light power received by the light receiver can be equalized between channels even when a plurality of optical fiber amplifiers are connected in series, so that stable characteristics can be obtained.

In the optical fiber transmission system according to the present invention, the gains of signals transmitted bidirectionally can be equalized even when a plurality of bidirectional optical fiber amplifiers are connected in series, so that stable characteristics can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical fiber amplifier for optically amplifying a plurality of signals having different wavelengths, comprising a series of rare earth doped optical fibers and at least one pump light source generating pump light for exciting the series of rare earth doped optical fibers, wherein a first signal among the plurality of signals propagates through a part of the series of rare earth doped optical fibers, and a second signal among the plurality of signals propagates through all of the series of rare earth doped optical fibers, wherein each of the series of rare earth doped optical fibers is pumped so that the first signal has a gain higher than a gain of the second signal.

2. An optical fiber amplifier according to claim 1, further comprising a branching optical fiber connected midway of the series of rare earth doped optical fibers, the first signal being output through the branching optical fiber.

3. An optical fiber amplifier according to claim 1, further comprising a branching optical fiber connected midway of the series of rare earth doped optical fibers, wherein the first signal is input through the branching optical fiber.

4. An optical fiber amplifier according to claim 1, wherein the at least one pump light source includes a laser diode.

5. An optical fiber amplifier according to claim 1, wherein a multiplexer/divider for coupling the pump light generated by the pump light source and the plurality of signals is connected to an input end of at least one of the series of rare earth doped optical fibers.

6. An optical fiber amplifier according to claim 1, wherein a multiplexer/divider for coupling the pump light generated by the pump light source and the plurality of signals is connected to an output end of at least one of the series of rare earth doped optical fibers.

7. An optical fiber amplifier according to claim 2, wherein means for selectively transmitting both of light in a first wavelength band and light in a second wavelength band while separating light which is neither in the first wavelength band nor the second wavelength band from other light to be input into the branching optical fiber is disposed midway of the series of rare earth doped optical fibers.

8. An optical fiber amplifier according to claim 3, wherein means for selectively transmitting both of light in a first wavelength band and light in a second wavelength band while separating light which is neither in the first wavelength band nor the second wavelength band from other light to be input into the branching optical fiber is disposed midway of the series of rare earth doped optical fibers.

9. An optical fiber amplifier according to claim 7, wherein the wavelength of the first signal is neither in the first wavelength band nor the second wavelength band, while the wavelength of the second signal is either in the first wavelength band or the second wavelength band.

10. An optical fiber amplifier according to claim 8, wherein the wavelength of the first signal is neither in the first wavelength band nor the second wavelength band, while the wavelength of the second signal is either in the first wavelength band or the second wavelength band.

11. An optical fiber amplifier according to claim 7, wherein the wavelength of the pump light is either in the first wavelength band or the second wavelength band.

12. An optical fiber amplifier according to claim 8, wherein the wavelength of the pump light is either in the first wavelength band or the second wavelength band.

13. An optical fiber amplifier according to claim 7, wherein the wavelength of the first signal is longer than the wavelength of the second signal, the first signal is analog-modulated, and the second signal is digital-modulated.

14. An optical fiber amplifier according to claim 8, wherein the wavelength of the first signal is longer than the wavelength of the second signal, the first signal is analog-modulated, and the second signal is digital-modulated.

15. A bidirectional optical fiber amplifier comprising:

a first input/output section for at least outputting a first signal and receiving a second signal;

a second input/output section for at least receiving the first signal and outputting the second signal;

an optical fiber amplifying section connected to the first and second input/output sections, the optical fiber amplifying section optically amplifying a plurality of signals having different wavelengths, and comprising a series of rare earth doped optical fibers and at least one pump light source generating pump light for exciting the series of rare earth doped optical fibers, a first signal among the plurality of signals propagating through a part of the series of rare earth doped optical fibers, while a second signal among the plurality of signals propagating through all of the series of rare earth doped optical fibers;

wherein each of the series of rare earth doped optical fibers is pumped so that the first signal has a gain higher than a gain of the second signal; and dividing means for selectively transmitting the first signal received from the optical fiber amplifying section to the first input/output section.

16. A bidirectional optical fiber amplifier according to claim 15, further comprising multiplexing means for coupling the second signal input through the first input/output section and the first signal input through the second input/output section, so as to input both the first and second signals into an input end of the series of rare earth doped optical fibers.

17. A bidirectional optical fiber amplifier according to claim 15, further comprising multiplexing means for inputting the first signal input through the second input/output section midway of the series of rare earth doped optical fibers.

18. A bidirectional optical fiber amplifier according to claim 15, wherein a first optical circulator is provided in the first input/output section, and a second optical circulator is provided in the second input/output section.

19. A bidirectional optical fiber amplifier according to claim 15, wherein first multiplexing/dividing means is provided in the first input/output section, while second multiplexing/dividing means is provided in the second input/output section.

20. An optical fiber transmission system comprising:

a transmitting station including a first signal light source for emitting a first signal and a first light receiver for detecting a second signal;

a receiving station including a second light receiver for detecting the first signal and a second signal light source for emitting the second signal;

an optical fiber transmission route for connecting the transmitting station and the receiving station; and an optical fiber amplifier disposed midway of the optical fiber transmission route, to wherein the optical fiber amplifying section optically amplifies a plurality of signals having different wavelengths, the section comprising a series of rare earth doped optical fibers and at least one pump light source generating pump light for exciting the series of rare earth doped optical fibers, wherein each of the series of rare earth doped optical fibers is pumped so that the first signal has a gain higher than a gain of the second signal, and a first signal among the plurality of signals propagates through a part of the series of rare earth doped optical fibers, and a second signal among the plurality of signals propagates through all of the series of rare earth doped optical fibers.

21. A bidirectional optical fiber transmission system according to claim 20, wherein at least one analog-modulated signal is used as the first signal, and a plurality of digital-modulated signals are used as the second signal.

22. An optical fiber transmission system comprising:

a transmitting station including a first signal light source for emitting a first signal and a first light receiver for detecting a second signal;

a receiving station including a second light receiver for detecting the first signal and a second signal light source for emitting the second signal;

a bidirectional optical fiber transmission route for connecting the transmitting station and the receiving station; and an optical fiber amplifier disposed midway of the optical fiber transmission route, wherein the bidirectional optical fiber includes:

a first input/output section for at least outputting a first signal and receiving a second signal;

a second input/output section for at least receiving the first signal and outputting the second signal;

an optical fiber amplifying section connected to the first and second input/output sections, the optical fiber amplifying section optically amplifying a plurality of signals having different wavelengths, and comprising a series of rare earth doped optical fibers and at least one pump light source generating pump light for exciting the series of rare earth doped optical fibers, a first signal among the plurality of signals propagating through a part of the series of rare earth doped optical fibers, while a second signal among the plurality of signals propagating through all of the series of rare earth doped optical fibers wherein each of the series of rare earth doped optical fibers is pumped so that the first signal has a gain higher than a gain of the second signal; and dividing means for selectively transmitting the first signals received from the optical fiber amplifying section to the first input/output section.

23. A bidirectional optical fiber transmission system according to claim 22, wherein at least one analog-modulated signal is used as the first signal, and a plurality of digital-modulated signals are used as the second signal.

* * * * *

UNITED STATES PATENT AND TRADEMARK OFFICE
CERTIFICATE OF CORRECTION

PATENT NO. : 5,563,733
DATED : October 8, 1996
INVENTOR(S) : Mitsuda et al.

It is certified that error appears in the above-indentified patent and that said Letters Patent is hereby corrected as shown below:

In Column 10, line 11, before the word "An" delete the number "15".

In Column 10, line 11, the sentence "An optical amplifying section..." should start a new paragraph.

In Column 17, line 46, before the word "wherein" delete the word "to".

Signed and Sealed this

Eighteenth Day of March, 1997

Attest:

BRUCE LEHMAN

Attesting Officer

Commissioner of Patents and Trademarks